US010434970B2

(12) United States Patent
Saito et al.

(10) Patent No.: US 10,434,970 B2
(45) Date of Patent: Oct. 8, 2019

(54) VEHICLE SIDE SECTION STRUCTURE

(71) Applicant: TOYOTA JIDOSHA KABUSHIKI KAISHA, Toyota-shi, Aichi-ken (JP)

(72) Inventors: Naohiro Saito, Toyota (JP); Junichi Takayanagi, Nagoya (JP); Masato Kunisada, Susono (JP); Takashi Sasaki, Kiyosu (JP); Takaki Fukuyama, Kiyosu (JP); Shigeyuki Suzuki, Kiyosu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 15/828,997

(22) Filed: Dec. 1, 2017

(65) Prior Publication Data

US 2018/0162316 A1    Jun. 14, 2018

(30) Foreign Application Priority Data

Dec. 8, 2016  (JP) ................................. 2016-238802
Apr. 21, 2017 (JP) ................................. 2017-084751

(51) Int. Cl.
| *B60R 21/231* | (2011.01) |
| *B60R 21/21*  | (2011.01) |
| *B60R 21/36*  | (2011.01) |
| *B60R 19/20*  | (2006.01) |
| *B60R 19/42*  | (2006.01) |
| *B60R 21/00*  | (2006.01) |

(Continued)

(52) U.S. Cl.
CPC ...... *B60R 21/23138* (2013.01); *B60R 19/205* (2013.01); *B60R 19/42* (2013.01); *B60R 21/21* (2013.01); *B60R 21/36* (2013.01); *B60J 5/0444* (2013.01); *B60R 2021/0006* (2013.01); *B60R 2021/01013* (2013.01)

(58) Field of Classification Search
CPC ... B60R 21/23138; B60R 21/36; B60R 19/42; B60R 19/205; B60R 21/21; B60R 2021/01013; B60R 2021/0006; B60J 5/0444

See application file for complete search history.

(56) References Cited

U.S. PATENT DOCUMENTS

| 5,785,376 A    | 7/1998 | Nees et al. |
| 6,883,631 B2 * | 4/2005 | Hu ........................ B60R 19/205 |
|                |        |             180/274 |

(Continued)

FOREIGN PATENT DOCUMENTS

| FR | 2 798 633 A1 | 3/2001 |
| JP | H07-47840 A  | 2/1995 |

(Continued)

*Primary Examiner* — Drew J Brown
(74) *Attorney, Agent, or Firm* — Oliff PLC

(57) ABSTRACT

A vehicle side section structure capable of stabilizing the deployment behavior of an airbag that inflates and deploys from a side door toward a vehicle width direction outer side is obtained. An impact beam is attached to a door inner panel. The impact beam includes a support portion that supports an inflator and that includes a side-wall portion disposed at the vehicle width direction inner side of the inflator. Accordingly, reaction force from the deployment of the airbag is able to be supported by the support portion of the impact beam when the airbag inflates and deploys.

14 Claims, 15 Drawing Sheets

(51) Int. Cl.
*B60R 21/01* (2006.01)
*B60J 5/04* (2006.01)

(56) References Cited

U.S. PATENT DOCUMENTS

| | | | |
|---|---|---|---|
| 7,232,001 B2 * | 6/2007 | Hakki | ............. B60R 19/205 |
| | | | 180/271 |
| 8,141,470 B1 | 3/2012 | Farinella et al. | |
| 8,801,035 B2 | 8/2014 | Kim et al. | |
| 9,120,444 B2 * | 9/2015 | Chung | ............. B60R 19/205 |
| 9,452,666 B1 * | 9/2016 | Suh | ............. B60J 11/025 |
| 2003/0155750 A1 | 8/2003 | Hu et al. | |
| 2008/0119993 A1 | 5/2008 | Breed | |
| 2010/0140903 A1 | 6/2010 | Choi et al. | |
| 2013/0147174 A1 | 6/2013 | Kim et al. | |
| 2015/0107928 A1 * | 4/2015 | Mazanek | ............. B60R 21/36 |
| | | | 180/274 |

FOREIGN PATENT DOCUMENTS

| | | |
|---|---|---|
| JP | 2000-127879 A | 5/2000 |
| JP | 2005-537165 A | 12/2005 |
| JP | 2010-132079 A | 6/2010 |
| JP | 2010-132255 A | 6/2010 |
| KR | 2013-0065116 A | 6/2013 |
| WO | 98/50254 A1 | 11/1998 |

* cited by examiner

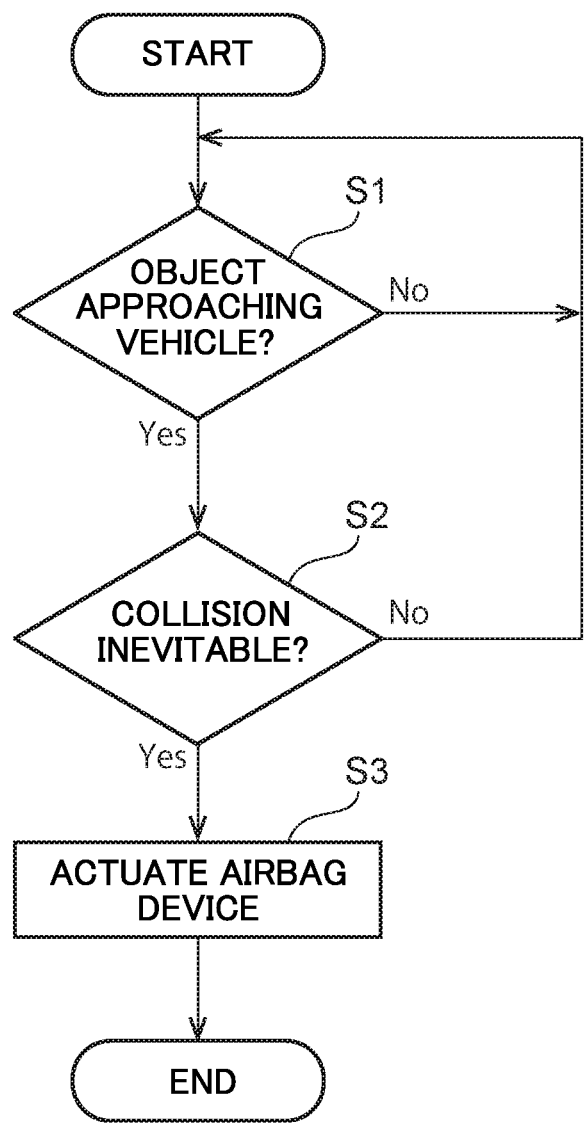

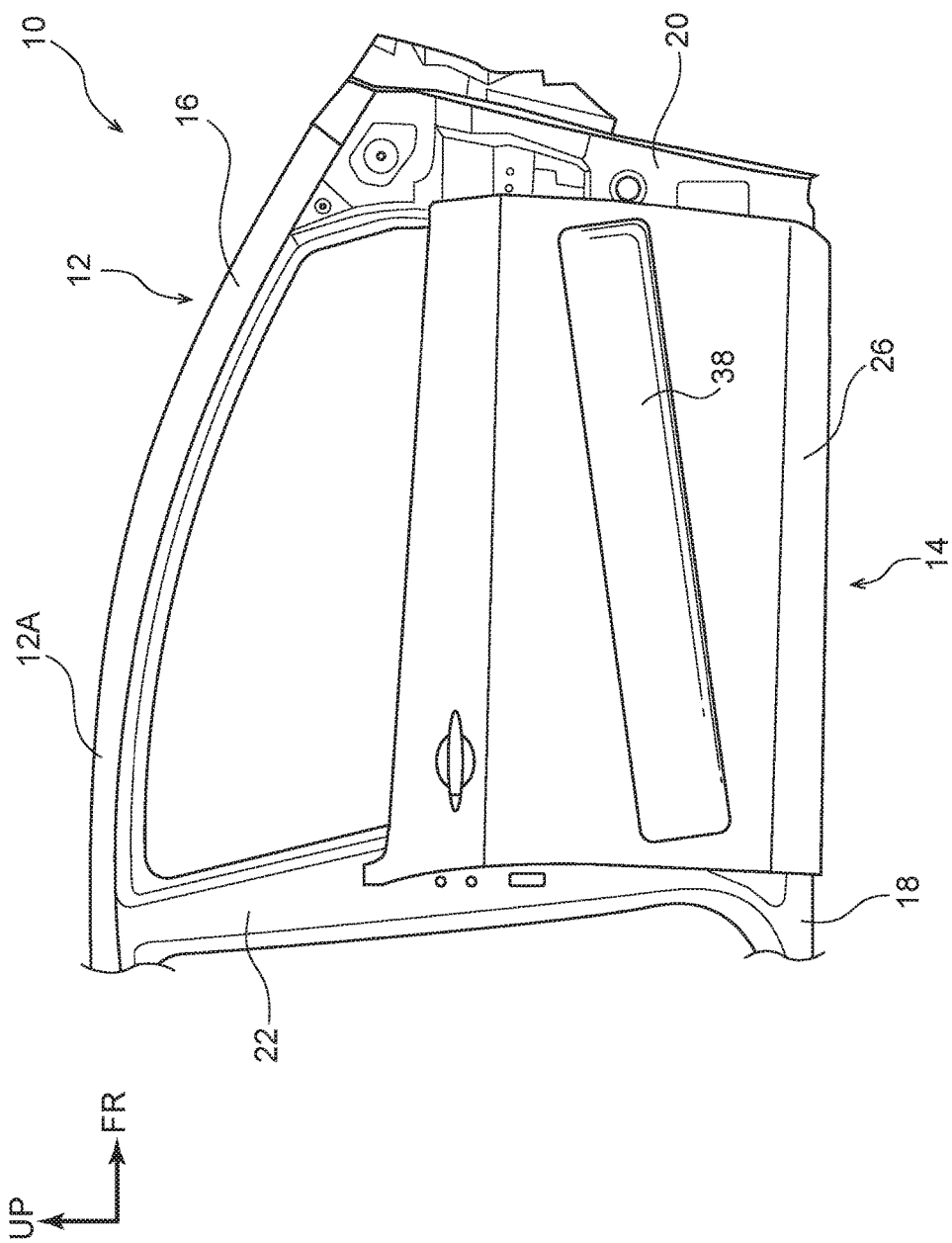

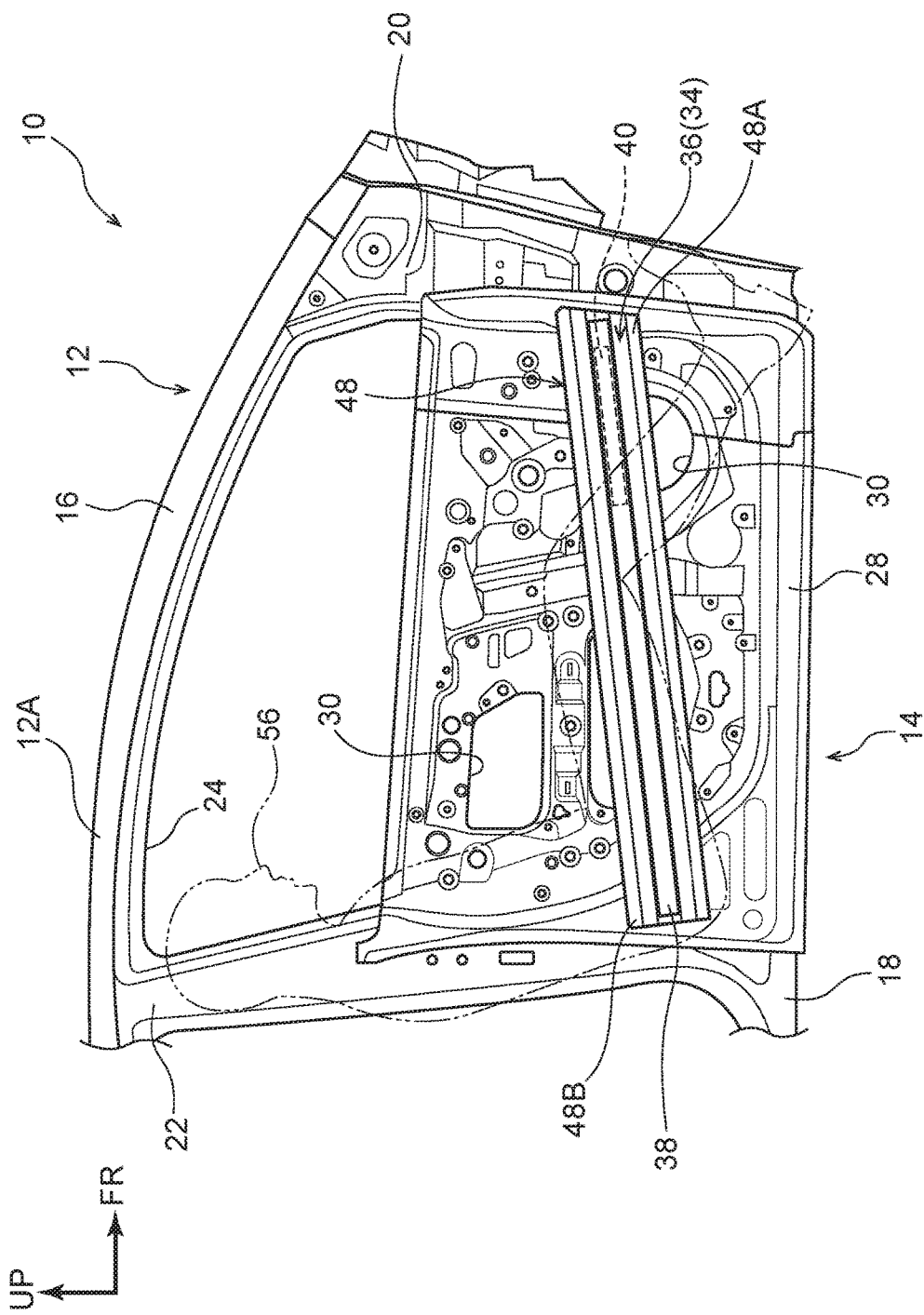

VEHICLE SIDE SECTION STRUCTURE

CROSS-REFERENCE TO RELATED APPLICATION

This application is based upon and claims the benefit of priority of the prior Japanese Patent Application No. 2016-238802, filed on Dec. 8, 2016 and Japanese Patent Application No. 2017-084751, filed on Apr. 21, 2017, the entire content of which are incorporated herein by reference.

TECHNICAL FIELD

The present disclosure relates to a vehicle side section structure.

RELATED ART

Japanese National-Phase Publication No. 2005-537165 (Patent Document 1) describes an invention related to an external airbag occupant protection system. In this external airbag occupant protection system, an inflator and an airbag are provided inside a side door. The external airbag occupant protection system also includes a predictive collision detection system to predict collisions between the vehicle and an object. When a collision between the vehicle and an object has been predicted by the predictive collision detection system, the inflator is actuated such that the airbag is inflated and deployed from the side door toward a vehicle width direction outer side. Accordingly, collision energy when the object and the vehicle collide is absorbed by the airbag, and, as a result, the relative speed of the object with respect to the vehicle is able to be reduced.

However, in the above related art, no member is provided to support reaction force from the deployment of the airbag. Thus, there is room for improvement with regards to stabilizing the deployment behavior of an airbag that inflates and deploys from a side door toward a vehicle width direction outer side.

SUMMARY

In consideration of the above circumstances, an object of the present disclosure is to obtain a vehicle side section structure capable of stabilizing the deployment behavior of an airbag that inflates and deploys from a side door toward a vehicle width direction outer side.

A vehicle side section structure according to a first aspect includes a door outer panel, a door inner panel, an airbag, a controller, an airbag inflation portion, and a reinforcement member. The door outer panel configures a vehicle width direction outer side portion of a side door. The door inner panel configures a vehicle width direction inner side portion of the side door. The airbag is capable of being inflated and deployed toward a vehicle width direction outer side of the side door by gas ejected due to actuation of an inflator disposed between the door outer panel and the door inner panel. The controller includes a prediction section that predicts whether or not an object approaching the vehicle will collide with the side door. The controller actuates the inflator when it has been determined that the object will collide with the side door based on a signal output from the prediction section. The airbag inflation portion is normally closed off. The airbag inflation portion is provided to the door outer panel such that the airbag is capable of being inflated and deployed to the vehicle width direction outer side of the door outer panel when the airbag is inflated and deployed. The reinforcement member is disposed at the vehicle width direction inner side of the inflator, includes a support portion supporting the inflator, and is attached to the door inner panel.

According the first aspect, the inflator is disposed between the door outer panel configuring a vehicle width direction outer side portion of the side door and the door inner panel configuring a vehicle width direction inner side portion of the side door. The inflator is controlled by the controller including the prediction section that predicts whether or not an object approaching the vehicle will collide with the side door of the vehicle. The controller actuates the inflator when the controller has determined that an object will collide with the side door based on the signal output from the prediction section.

In addition, the airbag inflation portion is provided to the door outer panel. The airbag inflation portion is normally closed off, and the airbag inflation portion is configured such that the airbag is able to inflate and deploy to the vehicle width direction outer side of the door outer panel when the airbag is inflated and deployed. Thus, when a collision between an object and the side door of the vehicle has been predicted, gas ejected due to actuation of the inflator inflates and deploys the airbag to the vehicle width direction outer side of the side door through the airbag inflation portion. As a result, even if there is a collision between the object and the vehicle, collision energy when the object and the vehicle collide is able to be absorbed by the airbag.

However, if there were to be no member to support reaction force from the deployment of the airbag when the airbag inflates and deploys, the deployment behavior of the airbag would conceivably be unstable.

To address this issue, in the present disclosure, the reinforcement member is attached to the door inner panel. The reinforcement member includes the support portion that is disposed at the vehicle width direction inner side of the inflator and that supports the inflator. This enables reaction force from the deployment of the airbag to be supported by the support portion of the reinforcement member when the airbag inflates and deploys.

A vehicle side section structure according to a second aspect is the first aspect, wherein the support portion is configured including a side-wall portion, an upper wall portion, and a lower wall portion. The side-wall portion has its plate thickness direction in the vehicle width direction and extends along the vehicle front-rear direction. The upper wall portion extends out toward the vehicle width direction outer side from a vehicle upper side peripheral edge portion of the side-wall portion. The lower wall portion extends out toward the vehicle width direction outer side from a vehicle lower side peripheral edge portion of the side-wall portion. Further, the inflator is configured in a tube shape having a closed end portion, and the inflator is disposed in a state surrounded by the support portion except for at the vehicle width direction outer side.

According to the second aspect, the support portion is configured including the side-wall portion, the upper wall portion, and the lower wall portion. The side-wall portion has its plate thickness direction in the vehicle width direction and extends along the vehicle front-rear direction. The upper wall portion extends out toward the vehicle width direction outer side from a vehicle upper side peripheral edge portion of the side-wall portion. The lower wall portion extends out toward the vehicle width direction outer side from a vehicle lower side peripheral edge portion of the side-wall portion. In addition, the inflator is configured in a tube shape having a closed end portion, and the inflator is disposed in a state surrounded by the support portion except for at the vehicle width direction outer side. The present disclosure thereby enables reaction force from the deployment of the airbag when the airbag inflates and deploys to be supported from three different directions excluding the vehicle width direction outer side.

A vehicle side section structure according to a third aspect is the first aspect, wherein the support portion is configured in a plate shape that extends along the vehicle front-rear direction, and the support portion has a circular arc shaped cross-section profile open toward the vehicle width direction outer side as viewed along its longitudinal direction. Further, the inflator is configured in a circular tube shape having a closed end portion, and the inflator is disposed in a state surrounded by the support portion except for at the vehicle width direction outer side.

According to the third aspect, the support portion is configured in a plate shape that extends along the vehicle front-rear direction, and the support portion has a circular arc shaped cross-section profile open toward the vehicle width direction outer side as viewed along its longitudinal direction. In addition, the inflator is configured in a circular tube shape having a closed end portion, and the inflator is disposed in a state surrounded by the support portion except for at the vehicle width direction outer side. In the present disclosure, the shape of the inflator corresponds to the shape of the support portion, enabling a gap to be suppressed from arising between the inflator and the support portion.

A vehicle side section structure according to a fourth aspect is the second aspect or the third aspect, wherein the reinforcement member is configured including at least one of an upper extending wall portion or a lower extending wall portion. The upper extending wall portion is disposed at the vehicle width direction outer side of the support portion and extends out toward a vehicle upper side from a vehicle upper side peripheral edge portion of the support portion. The lower extending wall portion is disposed at the vehicle width direction outer side of the support portion and extends out toward a vehicle lower side from a vehicle lower side peripheral edge portion of the support portion.

According to the fourth aspect, the reinforcement member is configured including at least one of the upper extending wall portion or the lower extending wall portion. The upper extending wall portion is disposed at the vehicle width direction outer side of the support portion and extends out toward the vehicle upper side from the vehicle upper side peripheral edge portion of the support portion. The lower extending wall portion is disposed at the vehicle width direction outer side of the support portion and extends out toward the vehicle lower side from the vehicle lower side peripheral edge portion of the support portion. Accordingly, in the present disclosure, at least one of the upper extending wall portion or the lower extending wall portion is disposed at the vehicle width direction inner side of the airbag after inflation and deployment of the airbag.

A vehicle side section structure according to a fifth aspect is the first aspect, wherein the inflator is configured in a tube shape extending along the vehicle front-rear direction and having a closed end portion, and the support portion is configured including an inner side-wall portion, a first extending wall portion, an outer side-wall portion, and a second extending wall portion. The inner side-wall portion is disposed at the vehicle width direction inner side of the inflator, extends along the inflator, and is joined to the door inner panel in a state in which its plate thickness direction is in the vehicle width direction. The first extending wall portion extends out toward the vehicle width direction outer side from a peripheral edge portion at either a vehicle upper side or a vehicle lower side of the inner side-wall portion. The outer side-wall portion extends out toward an opposite side of the first extending wall portion to that of the inflator from a vehicle width direction outer side peripheral edge portion of the first extending wall portion. The second extending wall portion extends out toward the vehicle width direction inner side from a peripheral edge portion of the outer side-wall portion on the opposite side of the outer side-wall portion to that of the inflator.

According to the fifth aspect, the inflator is configured in a tube shape extending along the vehicle front-rear direction and having a closed end portion. In addition, the support portion is configured including the inner side-wall portion, the first extending wall portion, the outer side-wall portion, and the second extending wall portion. The inner side-wall portion is disposed at the vehicle width direction inner side of the inflator, extends along the inflator, and is joined to the door inner panel in a state in which its plate thickness direction is in the vehicle width direction. This enables reaction force from deployment of the airbag to be supported by the inner side-wall portion and the door inner panel during inflation and deployment of the airbag.

Moreover, the first extending wall portion extends out toward the vehicle width direction outer side from a peripheral edge portion at either the vehicle upper side or the vehicle lower side of the inner side-wall portion, and the outer side-wall portion extends out toward an opposite side of the first extending wall portion to that of the inflator from the vehicle width direction outer side peripheral edge portion of the first extending wall portion. The second extending wall portion extends out toward the vehicle width direction inner side from the peripheral edge portion of the outer side-wall portion on the opposite side of the outer side-wall portion to that of the inflator.

Accordingly, the cross-section profile of a portion of the reinforcement member configured by the first extending wall portion, the outer side-wall portion, and the second extending wall portion is configured in a U-shape that is open toward the vehicle width direction inner side, as viewed along the longitudinal direction of the reinforcement member. As a result, the rigidity of the reinforcement member can be secured with respect to collision load transmitted through the airbag to the side door side from an object colliding with the vehicle.

A vehicle side section structure according to a sixth aspect is the fourth aspect when depending from the second aspect, wherein the reinforcement member is provided with the upper extending wall portion and the lower extending wall portion, and the reinforcement member includes a pair of tube shaped beam members extending along the support portion. The beam members are respectively disposed at the vehicle width direction inner side of the upper extending wall portion and the lower extending wall portion.

According to the sixth aspect, reaction force from the deployment of the airbag when the airbag inflates and deploys is able to be supported by the support portion from three different directions excluding the vehicle width direction outer side. The reinforcement member is provided with the upper extending wall portion and the lower extending wall portion, and the tube shaped beam members extending along the support portion are respectively disposed at the vehicle width direction inner side of the upper extending wall portion and the lower extending wall portion. The present disclosure thereby enables collision load transmitted through the airbag to the side door side from an object colliding with the vehicle to be supported by the pair of beam members.

A vehicle side section structure according to a seventh aspect is the fourth aspect when depending from the second aspect, wherein the reinforcement member is provided with the upper extending wall portion and the lower extending wall portion. A vehicle upper side of the upper extending wall portion is provided with a first reinforcement portion that is continuous with the upper extending wall portion, and a vehicle lower side of the lower extending wall portion is provided with a second reinforcement portion that is continuous with the lower extending wall portion. The first reinforcement portion is configured including a first upper reinforcement wall portion that extends out toward the vehicle width direction inner side from a vehicle upper side peripheral edge portion of the upper extending wall portion and a second upper reinforcement wall portion that extends out toward the vehicle upper side from a vehicle width direction inner side peripheral edge portion of the first upper reinforcement wall portion. The second reinforcement portion is configured including a first lower reinforcement wall portion that extends out toward the vehicle width direction inner side from a vehicle lower side peripheral edge portion of the lower extending wall portion and a second lower reinforcement wall portion that extends out toward the vehicle lower side from a vehicle width direction inner side peripheral edge portion of the first lower reinforcement wall portion.

According to the seventh aspect, the first reinforcement portion including the first upper reinforcement wall portion and the second upper reinforcement wall portion is configured at a vehicle upper side portion of the reinforcement member. The first reinforcement portion, the upper extending wall portion, and the upper wall portion and the side-wall portion of the support portion configure a portion with a hat shaped cross-section profile that is open toward the vehicle width direction inner side, as viewed along the longitudinal direction of the reinforcement member. In addition, the second reinforcement portion including the first lower reinforcement wall portion and the second lower reinforcement wall portion is configured at a vehicle lower side portion of the reinforcement member. The second reinforcement portion, the lower extending wall portion, and the lower wall portion and the side-wall portion of the support portion configure a portion with a hat shaped cross-section profile that is open toward the vehicle width direction inner side, as viewed along the longitudinal direction of the reinforcement member.

Accordingly, the second moment of area of the cross-section of the reinforcement member with respect to the neutral axis of vehicle width direction bending can be increased compared to a case in which the reinforcement member is configured having a uniform plate shape. As a result, the rigidity of the reinforcement member can be increased with respect to collision load transmitted through the airbag to the side door side from an object colliding with the vehicle.

A vehicle side section structure according to an eighth aspect is any one of the first aspect to the seventh aspect, wherein the airbag inflation portion is configured including a covering member that covers an opening formed in the door outer panel through which the airbag is able to pass during inflation and deployment. The covering member is configured so as to be separable from the door outer panel when pressed by the airbag.

According to the eighth aspect, an opening is formed in the door outer panel through which the airbag is able to pass during inflation and deployment. When a collision between an object and the side door of the vehicle has been predicted, the airbag is inflated and deployed, and passes through the opening to the vehicle width direction outer side of the side door.

From the perspective of ensuring the external appearance of the side door, the opening in the outer panel is preferably not normally visible from the vehicle width direction outer side. On the other hand, from the perspective of smoothly inflating and deploying the airbag, there is preferably nothing in the opening resisting the airbag during inflation and deployment of the airbag.

In the present disclosure, the opening formed in the door outer panel is covered by the covering member, and the opening and the airbag are normally hidden by the covering member. The covering member is configured so as to be separable from the door outer panel when pressed by the airbag during inflation and deployment. Thus, the covering member separates from the door outer panel toward the vehicle width direction outer side during inflation and deployment of the airbag such that the opening adopts an open state.

A vehicle side section structure according to a ninth aspect is the eighth aspect, wherein the covering member is coupled to the reinforcement member through a coupling portion. The coupling portion is able to maintain the coupled state between the covering member and the reinforcement member in a state in which the covering member has separated from the door outer panel.

According to the ninth aspect, the covering member is coupled to the reinforcement member through a coupling portion, and the coupled state between the covering member and the reinforcement member is maintained even in a state in which the covering member has separated from the door outer panel.

A vehicle side section structure according to a tenth aspect is any one of the first aspect to the seventh aspect, wherein the airbag inflation portion is configured including a covering member that covers an opening formed in the door outer panel through which the airbag is able to pass during inflation and deployment. The covering member is configured so as to split when pressed by the airbag so as to open into a state through which the airbag is able to pass.

The tenth aspect has basically the same configuration as the first aspect and exhibits similar operation and advantageous effects as the first aspect. In addition, in the present disclosure, the covering member covering the opening in the door outer panel is pressed by the airbag during inflation and deployment so as to split apart and open into a state through which the airbag is able to pass. Namely, in the present disclosure, the airbag is able to be inflated and deployed to the vehicle width direction outer side of the side door, from a state in which the covering member is disposed on the door outer panel.

A vehicle side section structure according to an eleventh aspect is any one of the first aspect to the seventh aspect, wherein the airbag inflation portion is configured including a tear portion that is provided to the door outer panel. The tear portion is configured so as to split when the door outer panel is pressed by the airbag during inflation and deployment, and such that by splitting, an opening through which the airbag is able to pass is formed in the door outer panel.

According to the eleventh aspect, the tear portion is provided to the door outer panel. The tear portion splits when the door outer panel is pressed by the airbag during inflation and deployment. The tear portion splits such that the opening through which the airbag is able to pass is formed in the door outer panel, and the airbag inflates and deploys to the vehicle width direction outer side of the side door. The formation of protrusions not necessitated by design on a styling face of the side door can thereby be suppressed, and a detrimental effect to the external appearance of the styling face can be suppressed, compared to a configuration in which an opening through which the airbag is able to pass is provided in the door outer panel and a covering member is disposed so as to cover the opening.

A vehicle side section structure according to a twelfth aspect is the eleventh aspect, wherein the door outer panel is made of resin.

According to the twelfth aspect, the door outer panel is made of resin, enabling a reduction in weight of the door outer panel to be achieved. Moreover, compared to a case in which the door outer panel is made of metal, load from the door outer panel that is borne by the airbag during inflation and deployment is reduced.

A vehicle side section structure according to a thirteenth aspect is any one of the first aspect to the twelfth aspect, wherein the inflator is disposed at a portion of the side door further toward the vehicle front than a vehicle front-rear direction central portion of the side door.

According to the thirteenth aspect, the inflator is disposed at a portion of the side door further toward the vehicle front than a vehicle front-rear direction central portion of the side door. This enables configuration to be made such that even if an object collides with the side door of the vehicle and the inflator is pressed and moved by the object, at least the upper body of an occupant is not positioned in the path of the inflator.

A vehicle side section structure according to a fourteenth aspect is any one of the first aspect to the thirteenth aspect, wherein the reinforcement member is disposed such that, as viewed along the vehicle width direction, a portion of the reinforcement member overlaps at least one of a front pillar or a center pillar. The front pillar configures part of a vehicle body, and a portion of the front pillar is disposed so as to overlap a vehicle front side peripheral edge portion of the door inner panel as viewed along the vehicle width direction. The center pillar configures part of the vehicle body, and a portion of the center pillar is disposed so as to overlap a vehicle rear side peripheral edge portion of the door inner panel as viewed along the vehicle width direction.

According to the fourteenth aspect, the reinforcement member is disposed such that, as viewed along the vehicle width direction, a portion of the reinforcement member overlaps at least one of a front pillar configuring part of the vehicle body or a center pillar similarly configuring part of a vehicle body. As viewed along the vehicle width direction, a portion of the front pillar is disposed so as to overlap a vehicle front side peripheral edge portion of the door inner panel, and as viewed along the vehicle width direction, a portion of the center pillar is disposed so as to overlap a vehicle rear side peripheral edge portion of the door inner panel. Thus, even if the reinforcement member is pressed by an object that has collided with the side door, the reinforcement member is supported by at least one of the front pillar or the center pillar in a state in which the door inner panel is interposed between the reinforcement member and the front pillar or the center pillar.

As explained above, the vehicle side section structure according to the first aspect has the excellent advantageous effect of enabling the deployment behavior of the airbag inflating and deploying from the side door toward the vehicle width direction outer side to be stabilized.

The vehicle side section structure according to the second aspect has the excellent advantageous effect of enabling the certainty with which the airbag will inflate and deploy toward the vehicle width direction outer side to be improved.

The vehicle side section structure according to the third aspect has the excellent advantageous effect of enabling enlargement of the space required for placement of the inflator and the reinforcement member to be suppressed.

The vehicle side section structure according to the fourth aspect has the excellent advantageous effect of enabling collision load transmitted through the airbag to the side door side from an object colliding with the vehicle to be supported by the reinforcement member.

The vehicle side section structure according to the fifth aspect has the excellent advantageous effect of enabling an increase in the reaction force from the deployment of the airbag able to be supported by the reinforcement member, and enables stable support by the reinforcement member of collision load transmitted through the airbag to the side door side from an object colliding with the vehicle.

The vehicle side section structure according to the sixth aspect has the excellent advantageous effect of enabling the support of reaction force from the deployment of the airbag and the support of collision load to the side door side to be assumed by different respective members.

The vehicle side section structure according to the seventh aspect has the excellent advantageous effect of enabling collision load to the side door side to be supported in a stabilized state.

The vehicle side section structure according to the eighth aspect has the excellent advantageous effect of enabling both a normal external appearance of the side door to be secured and resistance to the airbag during inflation and deployment of the airbag to be reduced.

The vehicle side section structure according to the ninth aspect has the excellent advantageous effect of enabling enables loss of the covering member during inflation and deployment of the airbag to be suppressed.

The vehicle side section structure according to the tenth aspect has the excellent advantageous effect of enabling a normal external appearance of the side door to be secured, and compared to a configuration in which the covering member separates from the side door, enables the impact of the covering member on the surrounding environment to be reduced.

The vehicle side section structure according to the eleventh aspect has the excellent advantageous effect of enabling both the number of components in the side door to be reduced and the external appearance of the side door to be secured.

The vehicle side section structure according to the twelfth aspect has the excellent advantageous effect of enabling the certainty with which the airbag will inflate and deploy toward the vehicle width direction outer side to be improved while reducing the weight of the side door.

The vehicle side section structure according to the thirteenth aspect has the excellent advantageous effect of enabling the inflator to be suppressed from moving toward the upper body of an occupant due to collision load from an object that has collided with the side door of the vehicle.

The vehicle side section structure according to the fourteenth aspect has the excellent advantageous effect of enabling collision load from an object that has collided with the side door of the vehicle to be supported by a frame member of the vehicle body.

BRIEF DESCRIPTION OF THE DRAWINGS

Exemplary embodiments of the present disclosure will be described in detail based on the following figures, wherein:

FIG. 2 is a flowchart illustrating processing performed in a side-collision airbag system provided to a vehicle to which a vehicle side section structure according to the first exemplary embodiment has been applied;

FIG. 4 is a side view illustrating a state after deployment of a side door airbag of a vehicle to which a vehicle side section structure according to the first exemplary embodiment has been applied, as viewed from a vehicle width direction outer side (viewed along the direction of arrow 4 in FIG. 3C);

FIG. 5 is a side view illustrating configuration of relevant portions of a side door of a vehicle to which a vehicle side section structure according to the first exemplary embodiment has been applied, in a state in which an outer door panel is not illustrated, as viewed from a vehicle width direction outer side;

DETAILED DESCRIPTION

First Exemplary Embodiment

Explanation follows regarding a first exemplary embodiment of a vehicle side section structure according to the present disclosure, with reference to FIG. 1 to FIG. 6. Note that in each of the drawings, the arrow FR indicates the vehicle front side, the arrow UP indicates the vehicle upper side, and the arrow RH indicates the vehicle width direction right side, as appropriate.

Figure 6:
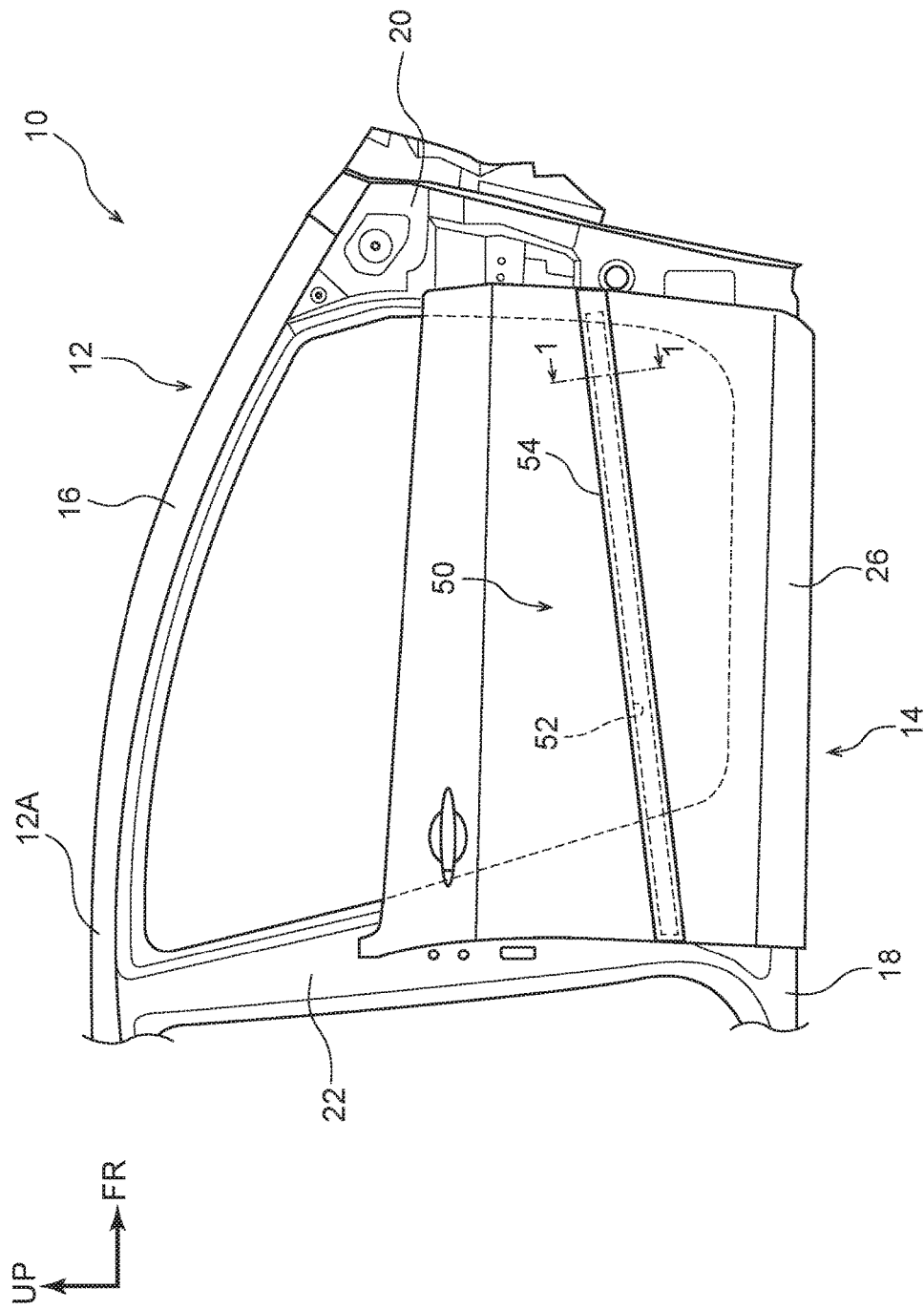
FIG. 6 is a side view illustrating configuration of a side door of a vehicle to which a vehicle side section structure according to the first exemplary embodiment has been applied, as viewed from a vehicle width direction outer side.

First, explanation follows regarding the schematic configuration of a vehicle 10 to which the vehicle side section structure according to the present exemplary embodiment has been applied, with reference to FIG. 5 and FIG. 6. Note that in the present exemplary embodiment, the vehicle 10 is basically configured with left-right symmetry. Therefore, in the following, explanation will focus on the configuration of portions on the vehicle width direction right side of the vehicle 10 and explanation of the configuration of portions on the vehicle width direction left side will be omitted as appropriate. The vehicle 10 is configured including a vehicle body 12, a side door (front side door) 14 attached to the vehicle body 12, and a side-collision airbag system 34, described below, installed to the vehicle 10.

The vehicle body 12 is configured including a roof side rail 16 that configures a vehicle upper side portion of the vehicle body 12 and extends along the vehicle front-rear direction, and a rocker 18 that configures a vehicle lower side portion of the vehicle body 12 and extends along the vehicle front-rear direction.

A front pillar 20 and a center pillar 22 that couple the roof side rail 16 and the rocker 18 together are provided to a side section 12A of the vehicle body 12. Specifically, the front pillar 20 extends along the vehicle vertical direction, and the front pillar 20 links a vehicle front side portion of the roof side rail 16 and a vehicle front side portion of the rocker 18 together in the vehicle vertical direction. The center pillar 22 extends along the vehicle vertical direction, and the center pillar 22 links a vehicle front-rear direction central portion of the roof side rail 16 and a vehicle front-rear direction central portion of the rocker 18 together. A door opening 24 that is bounded by the roof side rail 16, the rocker 18, the front pillar 20, and the center pillar 22, and that has a substantially rectangular shape as viewed along a vehicle width direction in which the side door 14 opens and closes, is formed in the side section 12A of the vehicle body 12.

As illustrated in FIG. 6, in a state in which the door opening 24 is closed (a state in which the side door 14 is shut), the width direction of the side door 14 (a door width direction) is aligned with the vehicle front-rear direction, and the thickness direction of the side door 14 (a door thickness direction) is aligned with the vehicle width direction. Note that both the door width direction and the door thickness direction used in the following explanation refer to a direction in a state in which the side door 14 is shut.

The side door 14 is configured including a door outer panel 26 that is made of metal and that configures a vehicle width direction outer side portion of the side door 14, and a door inner panel 28 that is made of metal and that configures a vehicle width direction inner side portion of the side door 14. The door outer panel 26 extends in the vehicle vertical direction and the vehicle front-rear direction. The door outer panel 26 is curved such that a vehicle width direction central portion of the door outer panel 26 protrudes toward the vehicle width direction outer side in a cross-section profile view along the vehicle vertical direction and such that a vehicle vertical direction central portion of the door outer panel 26 protrudes toward the vehicle width direction outer side in a cross-section profile view along the vehicle front-rear direction. In other words, the door outer panel 26 is bulged such that a central portion of the door outer panel 26 protrudes toward the vehicle width direction outer side, as viewed along the vehicle front-rear direction.

The door inner panel 28 extends along the vehicle vertical direction and the vehicle front-rear direction. Service holes 30, used for maintenance work or the like, are formed in the door inner panel 28 at plural locations. A peripheral edge portion of the door inner panel 28 is joined to a peripheral edge portion of the door outer panel 26 by hemming.

Figure 1:
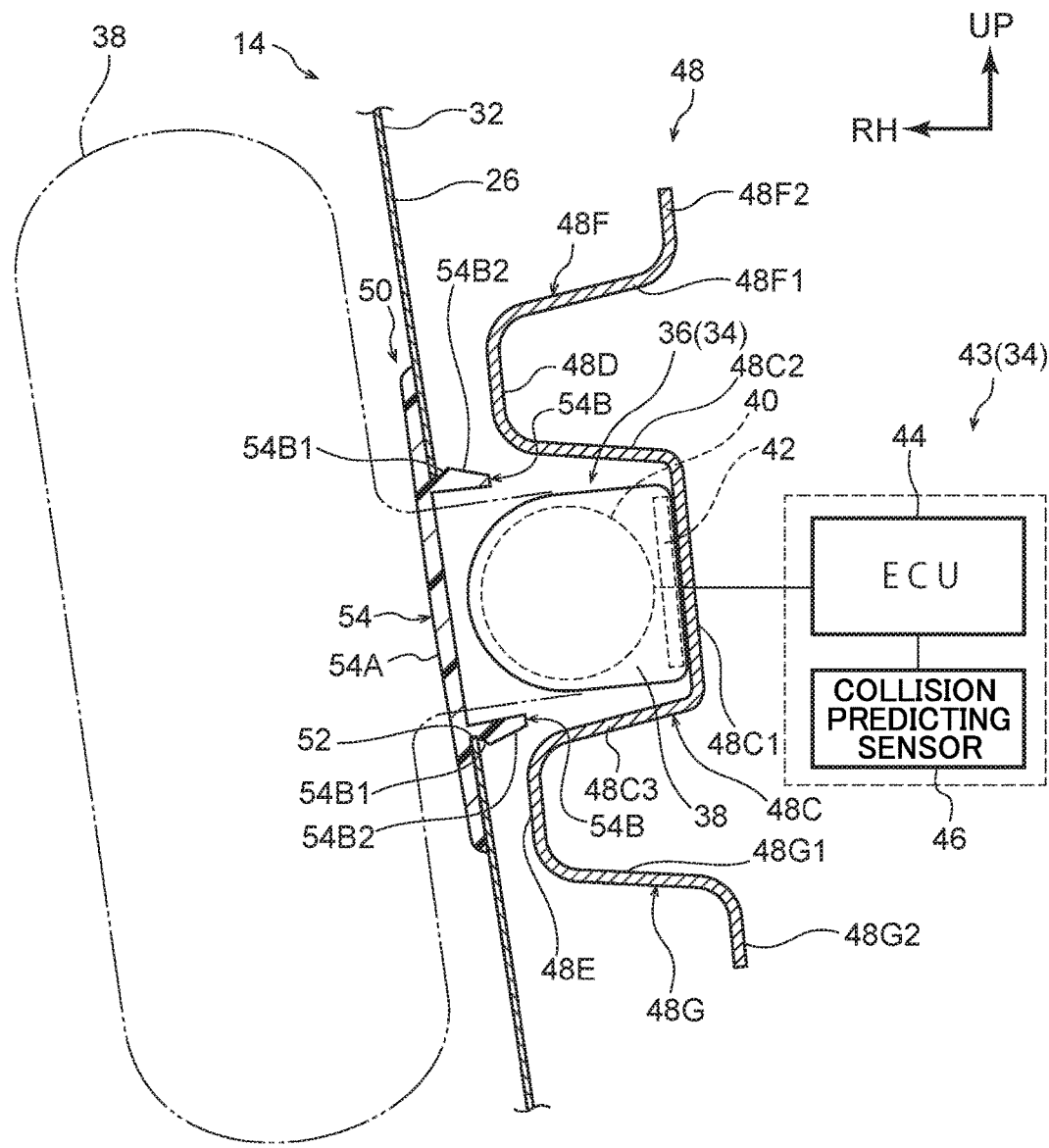
FIG. 1 is an enlarged cross-section (a cross-section illustrating a state sectioned along line 1-1 in FIG. 6) illustrating configuration of relevant portions of a side door of a vehicle to which a vehicle side section structure according to a first exemplary embodiment has been applied, as viewed from a vehicle front side.

As illustrated in FIG. 5, the side door 14 configured as described above is disposed such that a vehicle front side (one door width direction side) peripheral edge portion of the door inner panel 28 overlaps the front pillar 20 in a state in which the door opening 24 is closed off, as viewed along the vehicle width direction (the door thickness direction). In this state, a vehicle rear side (the other door width direction side) peripheral edge portion of the door inner panel 28 is in a state overlapping the center pillar 22, as viewed along the vehicle width direction. Further, an internal space 32 with depth in the vehicle front-rear direction and the vehicle width direction is formed between the door outer panel 26 and the door inner panel 28. As illustrated in FIG. 1, a known window gear, not illustrated, an impact beam 48 serving as a reinforcement member and an airbag device 36, both described below, and the like, are disposed within the internal space 32.

The airbag device 36 is attached to the impact beam 48 as described below. As illustrated in FIG. 1, the airbag device 36, configures part of the side-collision airbag system 34 together with a controller 43. The airbag device 36 is configured including an airbag 38 and an inflator 40, this being a gas generator.

The airbag 38 is, for example, configured in a bag shape by stitching together the outer peripheral edge portions of plural base cloths configured from a nylon-based or polyester-based material. The inflator 40 is built into a base end side (the vehicle width direction inner side) of the airbag 38. The airbag 38, in a state folded into a cylindrical shape using a predetermined folding method such as pleating or rolling, is wrapped in a non-illustrated wrapping material that is easily torn by inflation pressure from the inflator 40 and the airbag 38. Note that in figures in which the airbag 38 is depicted, the external profile of the airbag 38 is schematically illustrated.

The inflator 40 is what is referred to as a cylinder type inflator, with the inflator 40 being configured in a circular tube shape and both longitudinal direction end portions of the inflator 40 being closed. A vehicle rear side end portion of the inflator 40 is disposed so as to be positioned at the vehicle lower rear side of a vehicle front side end portion of the inflator 40, as viewed along the vehicle width direction. Namely, the inflator 40 is disposed in a state in which its longitudinal direction is inclined with respect to the vehicle front-rear direction by a predetermined angle, as viewed along the vehicle width direction. Note that the inflator 40 is positioned inside a vehicle front side end portion of the airbag 38 in a state in which the longitudinal direction of the inflator 40 is aligned with the longitudinal direction of the airbag 38 (see FIG. 5) when the airbag is in the folded state. A pair of non-illustrated stud bolts are provided to a base portion 42 that is provided at the vehicle width direction inner side of the inflator 40. The stud bolts project out toward the vehicle width direction inner side and are disposed at a predetermined spacing from each along the longitudinal direction of the inflator 40. The airbag device 36 including the inflator 40 is attached to the impact beam 48 by the stud bolts.

The airbag device 36 configured as described above is configured so that when the inflator 40 is actuated such that gas ejected therefrom is supplied to the airbag 38, the wrapping material splits open due to inflation pressure from the airbag 38 and the airbag 38 is inflated and deployed toward the vehicle width direction outer side (one door thickness direction side) of the side door 14. As illustrated in FIG. 1 and FIG. 4, the airbag 38 is configured such that the shape of the airbag 38, in an inflated-and-deployed state, forms an elliptical column shape as viewed along its longitudinal direction. Note that the longitudinal direction of the airbag 38 is along substantially the same direction in both the folded state and in the inflated-and-deployed state. The inflator 40 is electrically connected to the controller 43, and actuation of the inflator 40 is controlled by the controller 43.

As illustrated in FIG. 1, the controller 43 is configured including an ECU 44 that controls actuation of the inflator 40 and a collision predicting sensor 46 serving as a prediction section electrically connected to the ECU 44. The ECU 44 actuates the inflator 40 based on a signal output from the collision predicting sensor 46.

The collision predicting sensor 46 is provided to the side section of the vehicle 10, and is configured by a millimeter wave radar, a stereo camera, a laser radar (LiDAR), or the like. The collision predicting sensor 46 detects an object approaching the side section of the vehicle 10, more specifically the side door 14, measures the distance from the vehicle 10 to the object, and measures the relative speed between the vehicle 10 and the object. The measurements are output as signals to the ECU 44.

The ECU 44 determines whether or not an object approaching the vehicle 10 is present based on a signal input from the collision predicting sensor 46. In cases in which an object is approaching the vehicle 10, the ECU 44 determines whether or not the object and the vehicle 10 will collide. The side-collision airbag system 34 is set such that the inflator 40 is actuated by an actuation signal from the ECU 44 in cases in which the ECU 44 has determined (predicted) that a side-on collision between the vehicle 10 and an object approaching the vehicle 10 is inevitable.

A first feature of the present exemplary embodiment is the configuration of the impact beam 48 disposed within the internal space 32 of the side door 14 and supporting the airbag device 36. A second feature is that an airbag inflation portion 50 is configured so as to include an opening 52 formed in the door outer panel 26 for inflation of the airbag 38, and a door outer molding 54, serving as a covering member, that is attached to the opening 52. Detailed explanation follows regarding the configuration of the impact beam 48 and the airbag inflation portion 50, which configure relevant portions of the present exemplary embodiment.

First, explanation will be given regarding the configuration of the impact beam 48, with reference to FIG. 1 and FIG. 5. The impact beam 48 is, for example, configured by pressing steel. Overall, the impact beam 48 extends along the vehicle front-rear direction such that a vehicle rear side end portion 48B of the impact beam 48 is positioned at the vehicle lower rear side of a vehicle front side end portion 48A of the impact beam 48, as viewed along the vehicle width direction. The impact beam 48 is configured including a support portion 48C that supports the inflator 40, an extending wall portion 48D serving as an upper extending wall portion, an extending wall portion 48E serving as a lower extending wall portion, a reinforcement portion 48F serving as a first reinforcement portion, and a reinforcement portion 48G serving as a second reinforcement portion.

The support portion 48C is configured including a side-wall portion 48C1 that is disposed at the vehicle width direction inner side of the inflator 40, an upper wall portion 48C2 that extends out toward the vehicle width direction outer side from a vehicle upper side peripheral edge portion of the side-wall portion 48C1, and a lower wall portion 48C3 that extends out toward the vehicle width direction outer side from a vehicle lower side peripheral edge portion of the side-wall portion 48C1.

More specifically, the side-wall portion 48C1 has its plate thickness direction in the vehicle width direction and is configured in a rectangular plate shape extending in the vehicle front-rear direction, as viewed along the vehicle width direction, and the upper wall portion 48C2 and the lower wall portion 48C3 are configured in rectangular plate shapes extending in the vehicle front-rear direction, as viewed along the vehicle vertical direction. Note that the upper wall portion 48C2 and the lower wall portion 48C3 are disposed in a state facing each other with a predetermined spacing therebetween containing the airbag device 36 in a direction running along the side-wall portion 48C1. The spacing between the upper wall portion 48C2 and the lower wall portion 48C3 gradually widens on progression from the vehicle width direction inner side toward the vehicle width direction outer side.

The extending wall portion 48D extends out toward the vehicle upper side from a vehicle width direction outer side peripheral edge portion of the upper wall portion 48C2. The extending wall portion 48D can be understood as being disposed at the vehicle width direction outer side of the support portion 48C and as extending out toward the vehicle upper side from a vehicle upper side peripheral edge portion of the support portion 48C. Specifically, as viewed along the vehicle width direction, the extending wall portion 48D has a rectangular plate shape extending along the support portion 48C and is disposed in a state having a predetermined spacing from the door outer panel 26 and in a state facing the door outer panel 26.

The extending wall portion 48E extends out toward the vehicle lower side from a vehicle width direction outer side peripheral edge portion of the lower wall portion 48C3. The extending wall portion 48E can be understood as being disposed at the vehicle width direction outer side of the support portion 48C and as extending out from a vehicle lower side peripheral edge portion of the support portion 48C toward the vehicle lower side. Specifically, as viewed along the vehicle width direction, the extending wall portion 48E has a rectangular plate shape extending along the support portion 48C and is disposed in a state having a predetermined spacing from the door outer panel 26 and in a state facing the door outer panel 26.

The reinforcement portion 48F is configured including a reinforcement wall portion 48F1 serving as a first upper reinforcement wall portion and a flange portion 48F2 serving as a second upper reinforcement wall portion. Specifically, the reinforcement wall portion 48F1 extends out toward the vehicle width direction inner side from a vehicle upper side peripheral edge portion of the extending wall portion 48D, and is configured in a rectangular plate shape extending along the vehicle front-rear direction as viewed along the vehicle vertical direction. The flange portion 48F2 extends out toward the vehicle upper side from a vehicle width direction inner side peripheral edge portion of the reinforcement wall portion 48F1, and has a rectangular plate shape extending along the extending wall portion 48D as viewed along the vehicle width direction.

The reinforcement portion 48G is configured including a reinforcement wall portion 48G1 serving as a first lower reinforcement wall portion and a flange portion 48G2 serving as a second lower reinforcement wall portion. Specifically, the reinforcement wall portion 48G1 extends out toward the vehicle width direction inner side from a vehicle lower side peripheral edge portion of the extending wall portion 48E and is configured with a rectangular plate shape extending along the vehicle front-rear direction as viewed along the vehicle vertical direction. The flange portion 48G2 extends out toward the vehicle lower side from a vehicle width direction inner side peripheral edge portion of the reinforcement wall portion 48G1 and has a rectangular plate shape extending along the extending wall portion 48E as viewed along the vehicle width direction.

The airbag device 36 is disposed in the impact beam 48 configured as described above, in a state in which the longitudinal direction of the airbag device 36 is along the same direction as the longitudinal direction of the impact beam 48, and in a state surrounded by the side-wall portion 48C1, upper wall portion 48C2, and lower wall portion 48C3 of the support portion 48C except for at the vehicle width direction outer side. A pair of non-illustrated insertion portions corresponding to the stud bolts of the inflator 40 are formed in the side-wall portion 48C1. The airbag device 36 is fixed to the impact beam 48 by inserting the stud bolts of the inflator 40 into the insertion portions of the side-wall portion 48C1, and by fastening a non-illustrated fastening member, such as a nut, to the stud bolts from the vehicle width direction inner side of the side-wall portion 48C1. Note that, in a state in which the airbag device 36 is fixed to the impact beam 48, although configuration is such that the airbag device 36 is in a state where a portion of the airbag device 36 projects out further toward the vehicle width direction outer side than the impact beam 48, as viewed along the vehicle vertical direction, configuration may be such that the whole airbag device 36 is in a state hidden by the impact beam 48 as viewed along the vehicle vertical direction.

The impact beam 48 is fixed in place by joining the flange portions 48F2, 48G2 to the door inner panel 28 at non-illustrated joining portions by welding or the like. As illustrated in FIG. 5, in a state in which the impact beam 48 is fixed to the door inner panel 28, the end portion 48A and the end portion 48B of the impact beam 48 are respectively disposed so as to overlap the front pillar 20 and the center pillar 22, as viewed along the vehicle width direction. Note that in a state fixed to the side door 14, the inflator 40 of the airbag device 36 is disposed at a portion of the side door 14 further toward the vehicle front than a vehicle front-rear direction central portion of the side door 14. The vehicle vertical direction position of the inflator 40 is set so as to be near a vehicle vertical direction central portion of the side door 14.

Explanation follows regarding the configuration of the airbag inflation portion 50, primarily with reference to FIG. 1 and FIG. 6. The opening 52 formed in the door outer panel 26 has a rectangular shape that runs along the longitudinal direction of the airbag device 36 in its stored state and that is slightly larger than that of the airbag device 36, as viewed along the vehicle width direction. The airbag 38 is able to pass through the opening 52 during inflation and deployment. Note that the opening 52 is illustrated by a dashed line in FIG. 6.

The door outer molding 54 includes a cover portion 54A and plural anchor portions 54B, and is configured from an elastically deformable resin material. The cover portion 54A is configured in a rectangular plate shape that is slightly larger than the opening 52 as viewed along the vehicle width direction.

Plural sets of two of the anchor portions 54B facing each other along a transverse direction of the cover portion 54A are disposed along the longitudinal direction of the cover portion 54A. The anchor portions 54B are formed with substantially triangular shapes that project out toward peripheral edge portions of the cover portion 54A extending along the longitudinal direction thereof, as viewed along the longitudinal direction of the cover portion 54A. More specifically, an inclined face portion 54B1 is formed on the cover portion 54A side of each anchor portion 54B. Each inclined face portion 54B1 is inclined in a direction such that the width of the anchor portions 54B in the transverse direction of the cover portion 54A increases on progression toward the opposite side of the anchor portions 54B to that of the cover portion 54A. An inclined face portion 54B2 is formed on the opposite side of each anchor portion 54B to that of the cover portion 54A. Each inclined face portion 54B2 is inclined in a direction such that the width of the anchor portions 54B increases on progression toward the cover portion 54A side of the anchor portions 54B.

The anchor portions 54B of the door outer molding 54 configured as described above are anchored to a peripheral edge portion of the opening 52 to attach the door outer molding 54 to the door outer panel 26. Namely, the opening 52 is normally blocked off by the door outer molding 54. In other words, the airbag inflation portion 50 is normally closed off. By configuring the anchor portions 54B as described above, the anchor portions 54B elastically deform as the inclined face portions 54B2 press against peripheral edge portions of the opening 52 when the anchor portions 54B are inserted into the opening 52 during attachment of the door outer molding 54 to the opening 52.

In addition, the anchor portions 54B elastically deform as the inclined face portions 54B1 of the anchor portions 54B press against the peripheral edge portions of the opening 52 when an inflating and deploying airbag 38 presses the door outer molding 54. An anchored state of the anchor portions 54B to the peripheral edge portion of the opening 52 is thereby released, and the door outer molding 54 separates from the door outer panel 26.

Operation and Advantageous Effects of the Present Exemplary Embodiment

Explanation follows regarding operation and advantageous effects of the present exemplary embodiment.

First, a control flow of the side-collision airbag system 34 is explained in outline, with reference to FIG. 2. FIG. 2 illustrates an example of a control flow by the controller 43. When the control flow starts, at step S1, determination is made by the ECU 44 as to whether or not an object approaching the vehicle 10 is present based on a signal output from the collision predicting sensor 46. In cases in which it has been determined that there is not an object approaching the vehicle 10, step S1 is repeated. However, in cases in which it has been determined that an object is approaching the vehicle 10, processing proceeds to step S2.

At step S2, determination is made by the ECU 44 as to whether or not the object approaching the vehicle 10 will collide with the side door 14 of the vehicle 10 based on the signal output from the collision predicting sensor 46. In cases in which it has been determined that the object approaching the vehicle 10 will not collide with the vehicle 10, processing returns to step S1. However, in cases in which it has been determined that the object approaching the vehicle 10 will collide with the vehicle 10, processing proceeds to step S3.

At step S3, the inflator 40 is actuated by an actuation signal from the ECU 44 and the airbag 38 is inflated and deployed. After actuation of the inflator 40, the above control flow ends.

Explanation follows regarding the behavior of the airbag device 36 and of configuration elements disposed nearby the airbag device 36 in the vehicle 10 to which a vehicle side section structure according to the present exemplary embodiment has been applied.

In the present exemplary embodiment, as illustrated in FIG. 1, the inflator 40 is disposed between the door outer panel 26 configuring a vehicle width direction outer side portion of the side door 14 and the door inner panel 28 configuring a vehicle width direction inner side portion of the side door 14. As described above, the inflator 40 is actuated by the controller 43 when a collision between the side door 14 and an object approaching the vehicle 10 has been predicted.

The airbag inflation portion 50 is provided to the door outer panel 26. The airbag inflation portion 50 is normally closed off, and airbag inflation portion 50 is configured such that the airbag 38 is able to inflate and deploy to the vehicle width direction outer side of the door outer panel 26 when the airbag 38 is inflated and deployed. Thus, when a collision between an object and the side door 14 of the vehicle 10 has been predicted by the controller 43, gas ejected due to actuation of the inflator 40 inflates and deploys the airbag 38 to the vehicle width direction outer side of the side door 14 through the airbag inflation portion 50. As a result, even if there is a collision between the object and the vehicle 10 (the side door 14), collision energy when the object and the vehicle 10 collide is able to be absorbed by the airbag 38.

However, if there were to be no member to support reaction force from the deployment of the airbag 38 when the airbag 38 inflates and deploys, the deployment behavior of the airbag 38 would conceivably be unstable.

To address this issue, in the present exemplary embodiment, the impact beam 48 is attached to the door inner panel 28. The impact beam 48 includes the support portion 48C that supports the inflator 40 and that includes the side-wall portion 48C1 disposed at the vehicle width direction inner side of the inflator 40. This enables reaction force from the deployment of the airbag 38 to be supported by the support portion 48C of the impact beam 48 when the airbag 38 inflates and deploys. The present exemplary embodiment thereby enables the deployment behavior of the airbag 38 inflating and deploying from the side door 14 toward the vehicle width direction outer side to be stabilized.

Moreover, in the present exemplary embodiment, the support portion 48C is configured including the side-wall portion 48C1, the upper wall portion 48C2, and the lower wall portion 48C3. The side-wall portion 48C1 has its plate thickness direction in the vehicle width direction and extends along the vehicle front-rear direction. The upper wall portion 48C2 extends out toward the vehicle width direction outer side from a vehicle upper side peripheral edge portion of the side-wall portion 48C1. The lower wall portion 48C3 extends out toward the vehicle width direction outer side from a vehicle lower side peripheral edge portion of the side-wall portion 48C1. The inflator 40 is configured in a tube shape having closed end portions, and the inflator 40 is disposed in a state surrounded by the support portion 48C except for at the vehicle width direction outer side. The present exemplary embodiment thereby enables reaction force from the deployment of the airbag 38 when the airbag 38 inflates and deploys to be supported from three different directions excluding the vehicle width direction outer side. As a result, the certainty with which the airbag 38 will inflate and deploy toward the vehicle width direction outer side is able to be improved.

Moreover, in the present exemplary embodiment, the impact beam 48 is configured including the extending wall portion 48D and the extending wall portion 48E. The extending wall portion 48D is disposed at the vehicle width direction outer side of the support portion 48C and extends out toward the vehicle upper side from a vehicle upper side peripheral edge portion of the support portion 48C. The extending wall portion 48E is disposed at the vehicle width direction outer side of the support portion 48C and extends out toward the vehicle lower side from a vehicle lower side peripheral edge portion of the support portion 48C. Accordingly, in the present exemplary embodiment, the extending wall portion 48D and the extending wall portion 48E are disposed at the vehicle width direction inner side of the airbag 38 after inflation and deployment of the airbag 38. The present exemplary embodiment thereby enables collision load transmitted through the airbag 38 to the side door 14 side from an object colliding with the vehicle 10 to be supported by the impact beam 48.

In the present exemplary embodiment, the reinforcement portion 48F including the reinforcement wall portion 48F1 and the flange portion 48F2 is configured at a vehicle upper side portion of the impact beam 48. The reinforcement portion 48F, the extending wall portion 48D, and the upper wall portion 48C2 and the side-wall portion 48C1 of the support portion 48C configure a portion with a hat shaped cross-section profile that is open toward the vehicle width direction inner side, as viewed along the longitudinal direction of the impact beam 48. The reinforcement portion 48G including the reinforcement wall portion 48G1 and the flange portion 48G2 is configured at a vehicle lower side portion of the impact beam 48. The reinforcement portion 48G, the extending wall portion 48E, and the lower wall portion 48C3 and the side-wall portion 48C1 of the support portion 48C configure a portion with a hat shaped cross-section profile that is open toward the vehicle width direction inner side, as viewed along the longitudinal direction of the impact beam 48.

Accordingly, in the present exemplary embodiment, the second moment of area of the cross-section of the impact beam 48 with respect to the neutral axis of vehicle width direction bending can be increased compared to a case in which the impact beam 48 is configured having a uniform plate shape. As a result, the rigidity (in particular, rigidity with respect to vehicle width direction bending) of the impact beam 48 can be increased with respect to collision load transmitted through the airbag 38 to the side door 14 side from an object colliding with the vehicle 10. The present exemplary embodiment thereby enables collision load to the side door 14 side to be supported in a stabilized state.

Moreover, in the present exemplary embodiment, the door outer panel 26 is formed with the opening 52 through which the airbag 38 is able to pass during inflation and deployment. When a collision between an object and the side door 14 of the vehicle 10 has been predicted, the airbag 38 is inflated and deployed, and passes through the opening 52 to the vehicle width direction outer side of the side door 14.

From the perspective of ensuring the external appearance of the side door 14, the opening 52 in the door outer panel 26 is preferably not normally visible from the vehicle width direction outer side. On the other hand, from the perspective of smoothly inflation and deployment the airbag 38, there is preferably nothing in the opening 52 resisting the airbag 38 during inflation and deployment of the airbag 38.

Figure 3A:
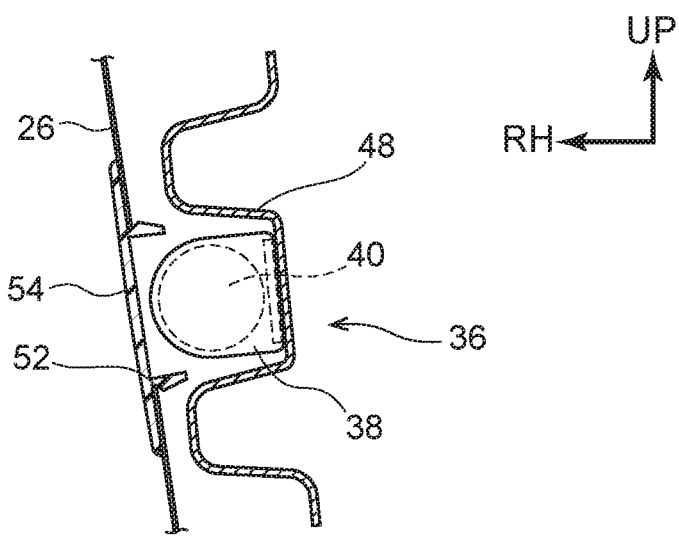
FIG. 3A is a cross-section illustrating the behavior of an airbag provided to a side door of a vehicle to which a vehicle side section structure according to the first exemplary embodiment has been applied, in a normal state, as viewed from the vehicle front side.
Figure 3B:
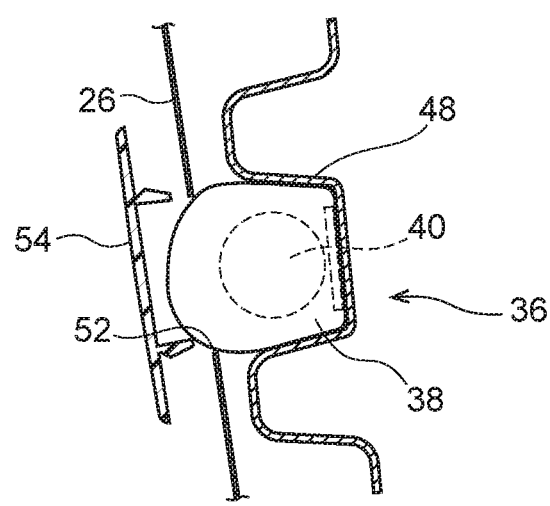
FIG. 3B is a cross-section illustrating the behavior of an airbag provided to a side door of a vehicle to which a vehicle side section structure according to the first exemplary embodiment has been applied, in a state directly after a predicted input time of a collision load, as viewed from a vehicle front side.
Figure 3C:
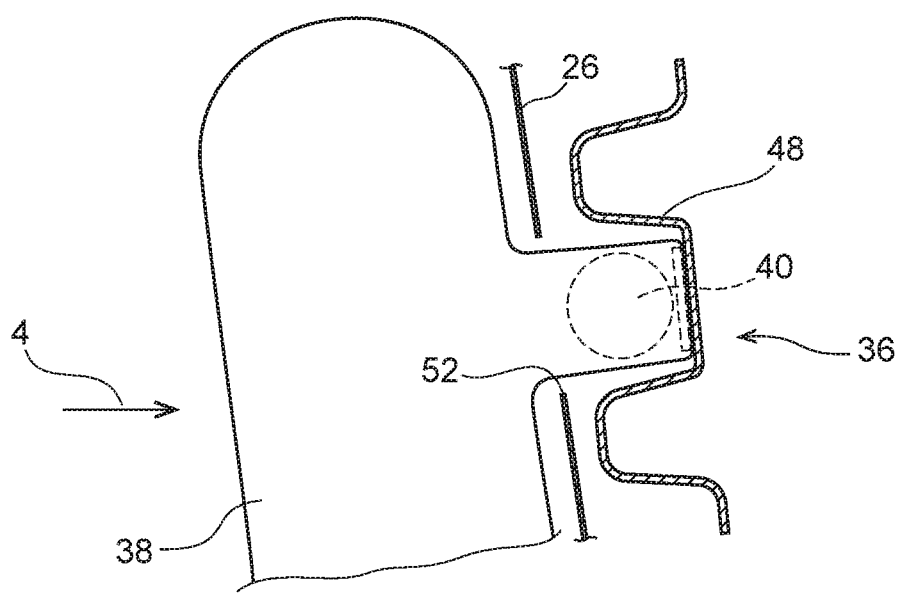
FIG. 3C is a cross-section illustrating the behavior of an airbag provided to a side door of a vehicle to which a vehicle side section structure according to the first exemplary embodiment has been applied, in a state after inflation and deployment, as viewed from a vehicle front side.

In the present exemplary embodiment, the opening 52 formed in the door outer panel 26 is covered by the door outer molding 54. Accordingly, as illustrated in FIG. 3A, the opening 52 and the airbag 38 are normally hidden by the door outer molding 54. The door outer molding 54 is configured so as to be separable from the door outer panel 26 when pressed by the airbag 38 during inflation and deployment. As illustrated in FIG. 3B, the door outer molding 54 thereby separates from the door outer panel 26 toward the vehicle width direction outer side during inflation and deployment of the airbag 38 such that the opening 52 adopts an open state. It is in this state, as illustrated in FIG. 3C, that the airbag 38 is inflated and deployed. The present exemplary embodiment thereby enables both a normal external appearance of the side door 14 to be secured and resistance to the airbag 38 during inflation and deployment of the airbag 38 to be reduced.

Moreover, in the present exemplary embodiment, as illustrated in FIG. 5, the inflator 40 is disposed at a portion of the side door 14 further toward the vehicle front than a vehicle front-rear direction central portion of the side door 14. This enables configuration to be made such that even if an object collides with the side door 14 of the vehicle 10 and the inflator 40 is pressed and moved by the object, at least the upper body of an occupant 56 is not positioned in the path of the inflator 40. The present exemplary embodiment thereby enables the inflator 40 to be suppressed from moving toward the upper body of the occupant 56 due to collision load from an object that has collided with the side door 14 of the vehicle 10.

In addition, in the present exemplary embodiment, the end portion 48A and the end portion 48B of the impact beam 48 are respectively disposed so as to overlap the front pillar 20 configuring part of the vehicle body 12 and the center pillar 22 similarly configuring part of the vehicle body 12, as viewed along the vehicle width direction. As viewed along the vehicle width direction, a portion of the front pillar 20 is disposed so as to overlap a vehicle front side peripheral edge portion of the door inner panel 28, and as viewed along the vehicle width direction, a portion of the center pillar 22 is disposed so as to overlap a vehicle rear side peripheral edge portion of the door inner panel 28. Thus, even if the impact beam 48 is pressed by an object that has collided with the side door 14, the impact beam 48 is supported by at least one of the front pillar 20 or the center pillar 22 in a state in which the door inner panel 28 is interposed between the impact beam 48 and the front pillar 20 or the center pillar 22. The present exemplary embodiment thereby enables collision load from an object that has collided with the side door 14 of the vehicle 10 to be supported by a frame member of the vehicle body 12.

Second Exemplary Embodiment

Figure 7:
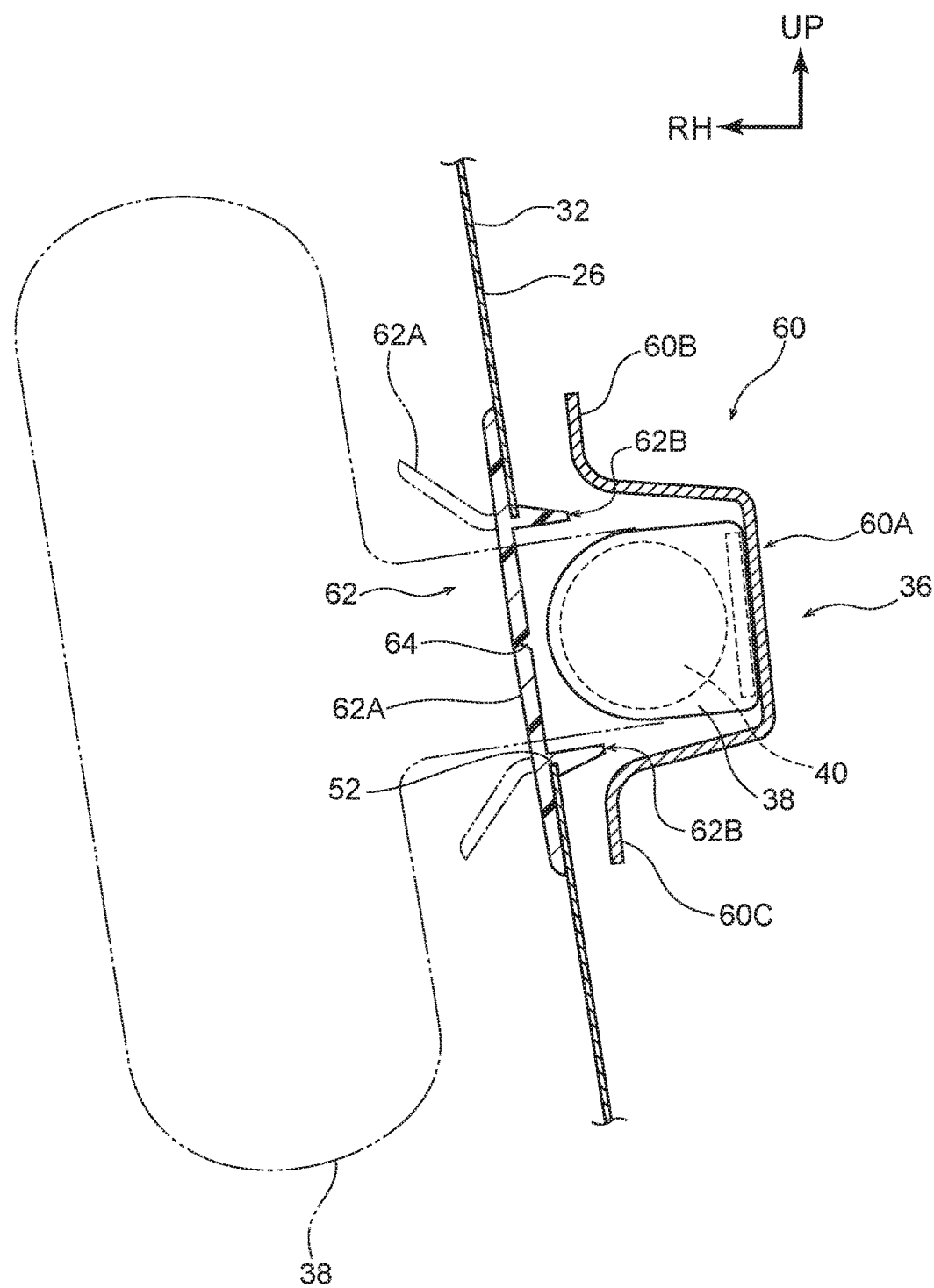
FIG. 7 is an enlarged cross-section (a cross-section corresponding to FIG. 1) illustrating configuration of relevant portions of a side door of a vehicle to which a vehicle side section structure according to a second exemplary embodiment has been applied, as viewed from a vehicle front side.

Explanation follows regarding a second exemplary embodiment of a vehicle side section structure according to the present disclosure, with reference to FIG. 7. Note that configuration portions similar to that of the first exemplary embodiment described above are appended with the same reference numerals, and explanation thereof is omitted.

The vehicle side section structure according to the present exemplary embodiment features an impact beam 60 serving as a reinforcement member not being provided with portions corresponding to the reinforcement portions 48F, 48G, and by a tear portion 64 formed in a door outer molding 62 serving as a covering member. Note that in the present exemplary embodiment, as described below, the door outer molding 62 functions as an airbag inflation portion.

To explain further, the impact beam 60 is configured including a support portion 60A, an extending wall portion 60B serving as an upper extending wall portion, and an extending wall portion 60C serving as a lower extending wall portion. Note that the support portion 60A is configured having a similar shape to the support portion 48C, the extending wall portion 60B is configured having a similar shape to the extending wall portion 48D, and the extending wall portion 60C is configured having a similar shape to the extending wall portion 48E.

The impact beam 60 is, for example, configured from high tensile strength steel having a greater tensile strength than the steel configuring the impact beam 48, and has a rigidity (rigidity with respect to vehicle width direction bending) equal to that of the impact beam 48. In the present exemplary embodiment, the impact beam 60 is fixed in place by joining the support portion 60A to the door inner panel 28 at non-illustrated joining portions by welding or the like.

The door outer molding 62 is configured including a cover portion 62A, which is formed having the same shape as the cover portion 54A of the door outer molding 54 as viewed from the vehicle width direction outer side, and anchor portions 62B. The anchor portions 62B are arranged similarly to the anchor portions 54B of the door outer molding 54. However, the shape of the anchor portions 62B differs from that of the anchor portions 54B.

Specifically, as viewed along the longitudinal direction of the cover portion 62A, the anchor portions 62B are formed in trapezoidal shapes that widen on progression toward the cover portion 62A side of each anchor portion 62B. Accordingly, although the anchor portions 62B can be inserted into the opening 52 similarly to the anchor portions 54B, after the door outer molding 62 has been attached to the door outer panel 26, the anchor portions 62B function as barbs. Thus, in the present exemplary embodiment, the door outer molding 62 does not separate from the door outer panel 26 even when pressed from the vehicle width direction inner side.

Moreover, in the present exemplary embodiment, the groove shaped tear portion 64 is formed in a vehicle width direction inner face of the cover portion 62A so as to follow a center line extending along the longitudinal direction of the cover portion 62A. Thus, when pressed by an inflating and deploying airbag 38, the cover portion 62A splits apart (deploys) in the vehicle vertical direction at the tear portion 64 so as to open into a state through which the airbag 38 is able to pass. Note that the cover portion 62A is illustrated post-deployment by a double-dotted dashed line in FIG. 7.

Such configuration is able to exhibit basically the same operation and advantageous effects as the first exemplary embodiment described above, apart from the operation and advantageous effects of the reinforcement portions 48F, 48G.

In addition, in the present exemplary embodiment, the door outer molding 62 covering the opening 52 of the door outer panel 26 is pressed by the airbag 38 during inflation and deployment so as to split apart and open into a state through which the airbag 38 is able to pass. Namely, in the present exemplary embodiment, the airbag 38 is able to be inflated and deployed to the vehicle width direction outer side of the side door 14, from a state in which the door outer molding 62 is disposed on the door outer panel 26. The present exemplary embodiment thereby enables a normal external appearance of the side door 14 to be secured, and compared to a configuration in which a member separates from the side door 14 like the door outer molding 54, enables the impact of the door outer molding 62 on the surrounding environment to be reduced.

Third Exemplary Embodiment

Figure 8:
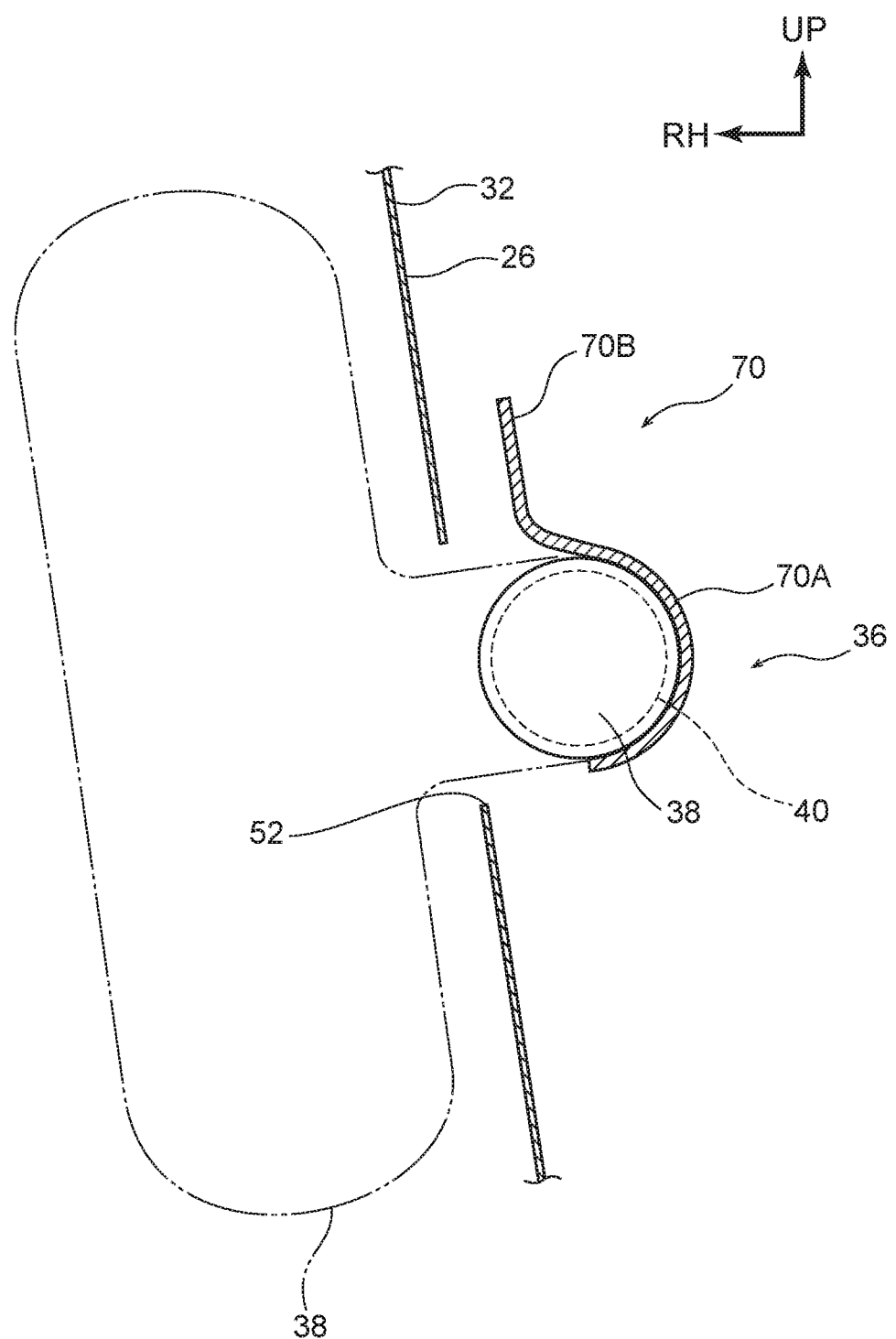
FIG. 8 is an enlarged cross-section (a cross-section corresponding to FIG. 1) illustrating configuration of relevant portions of a side door of a vehicle to which a vehicle side section structure according to a third exemplary embodiment has been applied, as viewed from a vehicle front side.

Explanation follows regarding a third exemplary embodiment of a vehicle side section structure according to the present disclosure, with reference to FIG. 8. Note that configuration portions similar to that of the first exemplary embodiment described above are appended with the same reference numerals, and explanation thereof is omitted.

The vehicle side section structure according to the present exemplary embodiment features an impact beam 70 serving as a reinforcement member configured in a substantially semicircular tube shape.

To explain further, the impact beam 70 extends similarly to the impact beam 48, and is configured including a support portion 70A and an extending wall portion 70B serving as an upper extending wall portion. Specifically, the support portion 70A is configured in a plate shape that extends along the vehicle front-rear direction, and the support portion 70A has a circular arc shaped cross-section profile that is open toward the vehicle width direction outer side as viewed along its longitudinal direction. The extending wall portion 70B extends out toward the vehicle upper side from a vehicle upper side peripheral edge portion of the support portion 70A and is formed in a rectangular plate shape as viewed along the vehicle width direction. Note that depending on the configuration of the side door 14 or the like, configuration may be made such that the extending wall portion 70B extends out toward the vehicle lower side from a vehicle lower side peripheral edge portion of the support portion 70A, and such that the extending wall portion 70B functions as a lower extending wall portion.

In addition, in the present exemplary embodiment, the airbag device 36 may be disposed in a state in which the airbag 38 is folded so as to form a circular column shape running along an inner peripheral face of the support portion 70A, and in a state surrounded by the support portion 70A except for at the vehicle width direction outer side. Note that in the present exemplary embodiment, either the door outer molding 54 or the door outer molding 62 is attached to the opening 52 of the door outer panel 26.

Such configuration is able to exhibit basically the same operation and advantageous effects as the first exemplary embodiment described above, apart from the operation and advantageous effects of the extending wall portion 48E and the reinforcement portions 48F, 48G. In addition, in the present exemplary embodiment, the shape of the inflator 40, and by extension the shape of the airbag device 36, corresponds to the shape of the support portion 70A, enabling a gap to be suppressed from arising between the inflator 40 and the support portion 70A. The present exemplary embodiment thereby enables enlargement of the space required for placement of the inflator 40 and the impact beam 70 to be suppressed.

Fourth Exemplary Embodiment

Figure 9:
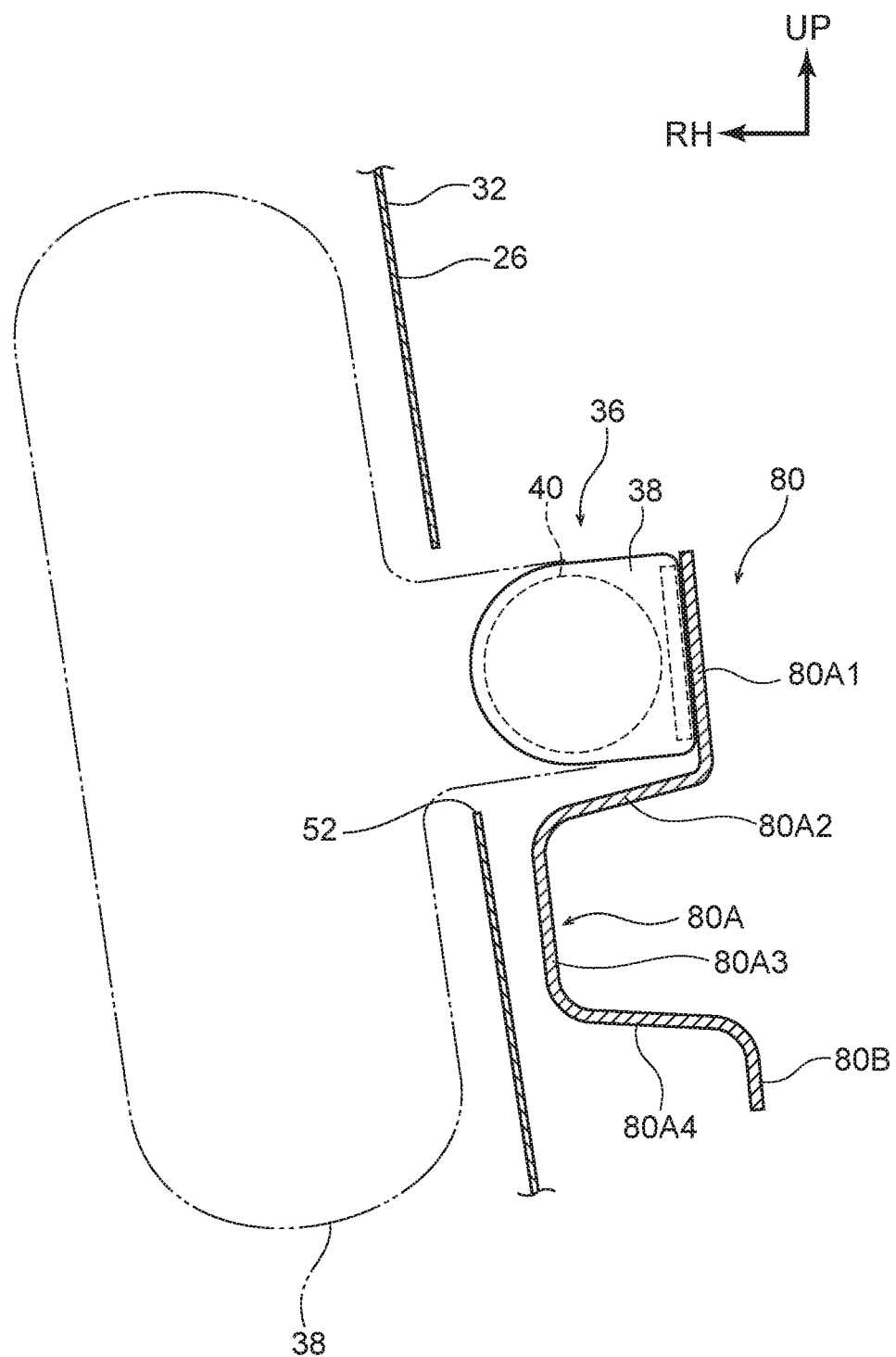
FIG. 9 is an enlarged cross-section (a cross-section corresponding to FIG. 1) illustrating configuration of relevant portions of a side door of a vehicle to which a vehicle side section structure according to a fourth exemplary embodiment has been applied, as viewed from a vehicle front side.

Explanation follows regarding a fourth exemplary embodiment of a vehicle side section structure according to the present disclosure, with reference to FIG. 9. Note that configuration portions similar to that of the first exemplary embodiment described above are appended with the same reference numerals, and explanation thereof is omitted.

The vehicle side section structure according to the present exemplary embodiment features an impact beam 80 serving as a reinforcement member. The impact beam 80 extends similarly to the impact beam 48, includes a support portion 80A and a flange portion 80B, and is configured having a hat shaped cross-section profile as viewed along its longitudinal direction.

To explain further, the support portion 80A is configured including an inner side-wall portion 80A1, an extending wall portion 80A2 serving as a first extending wall portion, an outer side-wall portion 80A3, and an extending wall portion 80A4 serving as a second extending wall portion. The inner side-wall portion 80A1 extends along the inflator 40 at the vehicle width direction inner side of the inflator 40, and is disposed in a state having its plate thickness direction in the vehicle width direction. The extending wall portion 80A2 extends out toward the vehicle width direction outer side from a vehicle lower side peripheral edge portion of the inner side-wall portion 80A1. The outer side-wall portion 80A3 extends out from a vehicle width direction outer side peripheral edge portion of the extending wall portion 80A2 on the opposite side of the extending wall portion 80A2 to that of the inflator 40. The extending wall portion 80A4 extends out toward the vehicle width direction inner side from a peripheral edge portion of the outer side-wall portion 80A3 on the opposite side of the outer side-wall portion 80A3 to that of the inflator 40.

Note that depending on the configuration of the side door 14 or the like, the support portion 80A may be configured such that the extending wall portion 80A2, the outer side-wall portion 80A3, and the extending wall portion 80A4 are disposed in this sequence on the vehicle upper side of the inner side-wall portion 80A1.

Moreover, in the present exemplary embodiment, the impact beam 80 is fixed in place by joining the inner side-wall portion 80A1, and the flange portion 80B extending out from a vehicle width direction inner side peripheral edge portion of the extending wall portion 80A4 on the opposite side of the extending wall portion 80A4 to that of the inflator 40, to the door inner panel 28 at non-illustrated joining portions by welding or the like. Note that in the present exemplary embodiment, either the door outer molding 54 or the door outer molding 62 is attached to the opening 52 of the door outer panel 26.

With such configuration, the inner side-wall portion 80A1 is disposed at the vehicle width direction inner side of the inflator 40 so as to extend along the inflator 40, and the inner side-wall portion 80A1 is joined to the door inner panel 28 in a state having its plate thickness direction in the vehicle width direction. This enables reaction force from the deployment of the airbag 38 to be supported by the inner side-wall portion 80A1 and the door inner panel 28 when the airbag 38 inflates and deploys.

Moreover, collision load transmitted through the airbag 38 to the side door 14 side from an object colliding with the vehicle 10 is supported by the outer side-wall portion 80A3. In the present exemplary embodiment, the cross-section profile of a portion of the impact beam 80 configured by the extending wall portion 80A2, the outer side-wall portion 80A3, and the extending wall portion 80A4 is configured in a U-shape that is open toward the vehicle width direction inner side, as viewed along the longitudinal direction of the impact beam 80. This enables the rigidity of the impact beam 80 to be secured with respect to collision load transmitted through the airbag 38 to the side door 14 side from an object colliding with the vehicle 10. The present exemplary embodiment thereby enables an increase in the reaction force from the deployment of the airbag 38 able to be supported by the impact beam 80, and enables stable support by the impact beam 80 of collision load transmitted through the airbag 38 to the side door 14 side from an object colliding with the vehicle 10.

Fifth Exemplary Embodiment

Figure 10:
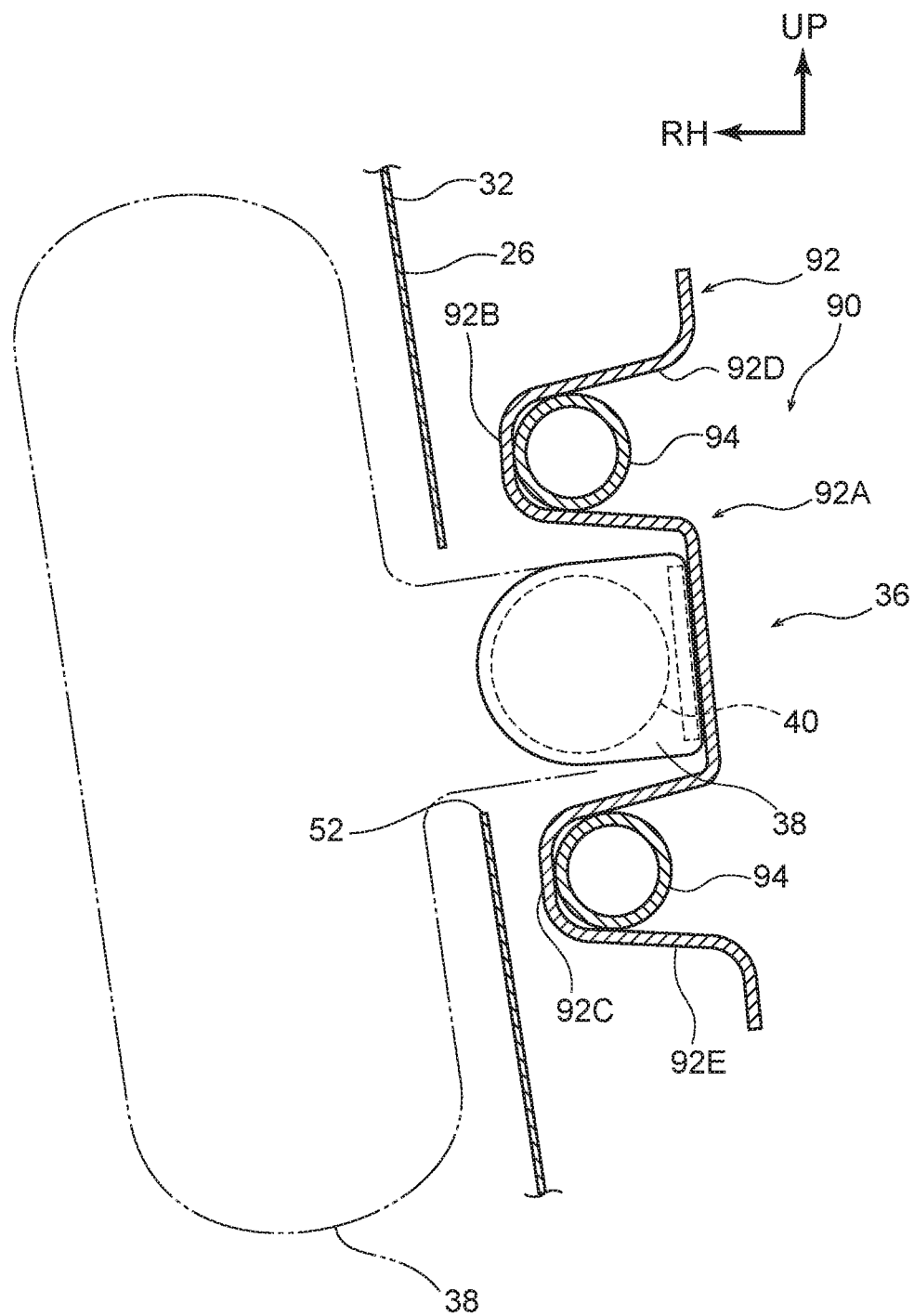
FIG. 10 is an enlarged cross-section (a cross-section corresponding to FIG. 1) illustrating configuration of relevant portions of a side door of a vehicle to which a vehicle side section structure according to a fifth exemplary embodiment has been applied, as viewed from a vehicle front side.

Explanation follows regarding a fifth exemplary embodiment of a vehicle side section structure according to the present disclosure, with reference to FIG. 10. Note that configuration portions similar to that of the first exemplary embodiment described above are appended with the same reference numerals, and explanation thereof is omitted.

The vehicle side section structure according to the present exemplary embodiment features an impact beam 90 serving as a reinforcement member. The impact beam 90 is configured including a panel member 92 configured having basically the same shape as the impact beam 48, and a pair of beam members 94.

To explain further, the panel member 92 is configured including a support portion 92A, an extending wall portion 92B serving as an upper extending wall portion, an extending wall portion 92C serving as a lower extending wall portion, a reinforcement portion 92D serving as a first reinforcement portion, and a reinforcement portion 92E serving as a second reinforcement portion. The panel member 92 is configured from steel having a thinner plate thickness than, or steel having a lower tensile strength than, the steel configuring the impact beam 48. The panel member 92 is joined to the door inner panel 28 at non-illustrated joining portions by welding or the like.

The beam members 94 are configured in circular tube shapes extending along the support portion 92A. The beam members 94 are respectively disposed at the vehicle width direction inner side of the extending wall portions 92B, 92C and are joined to the panel member 92 at non-illustrated joining portions by welding or the like. Note that a non-illustrated plate shaped extension portion is provided to each end portion of the beam members 94, and the extension portion is joined to the door inner panel 28 at a non-illustrated joining portion by welding or the like. In the present exemplary embodiment, either the door outer molding 54 or the door outer molding 62 is attached to the opening 52 of the door outer panel 26.

Such configuration is able to exhibit basically the same operation and advantageous effects as the first exemplary embodiment described above. In addition, the present exemplary embodiment enables reaction force from the deployment of the airbag 38 to be supported by the support portion 92A from three different directions excluding the vehicle width direction outer side, and enables collision load transmitted through the airbag 38 to the side door 14 side from an object colliding with the vehicle 10 to be supported by the pair of beam members 94. The present exemplary embodiment thereby enables the support of reaction force from the deployment of the airbag 38 and the support of collision load to the side door 14 side to be assumed by different respective members.

Sixth Exemplary Embodiment

Figure 11:
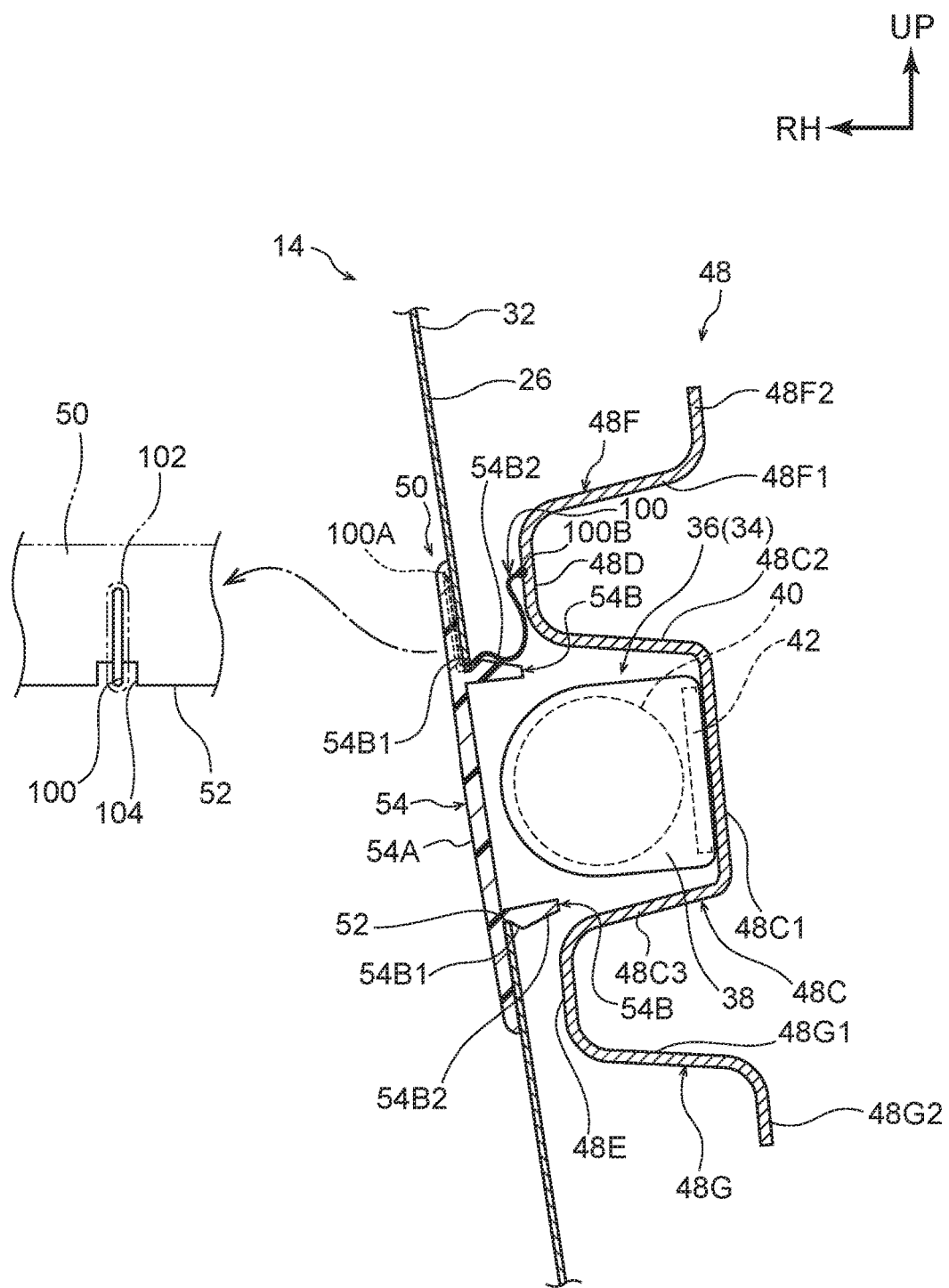
FIG. 11 is an enlarged cross-section (a cross-section corresponding to FIG. 1) illustrating configuration of relevant portions of a side door of a vehicle to which a vehicle side section structure according to a sixth exemplary embodiment has been applied, as viewed from a vehicle front side.
Figure 12:
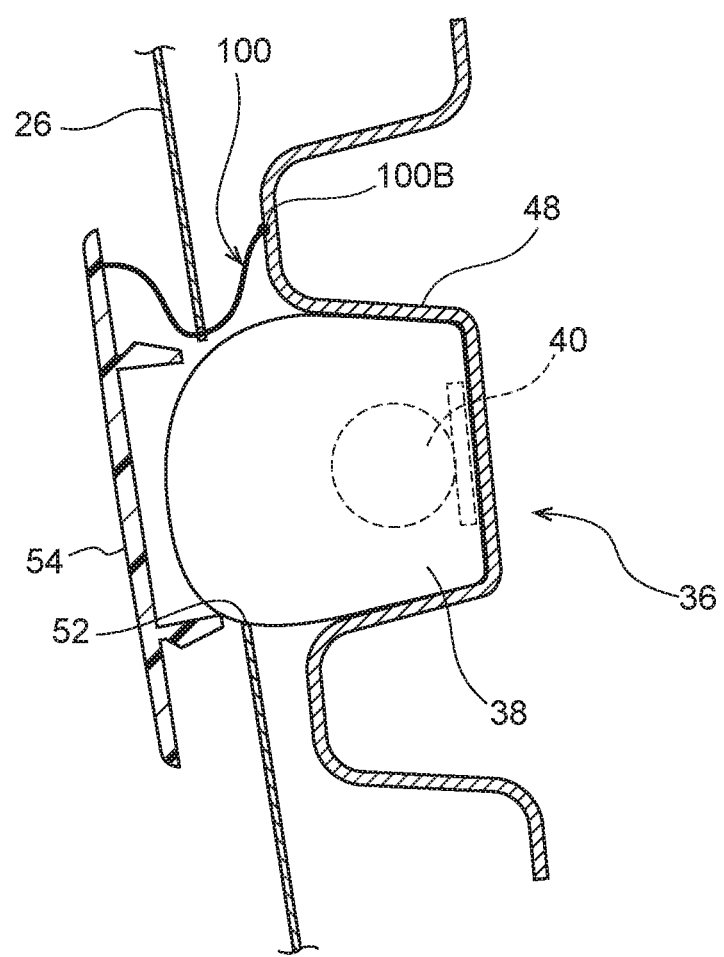
FIG. 12 is a cross-section illustrating the behavior of an airbag and a covering member provided to a side door of a vehicle to which a vehicle side section structure according to the sixth exemplary embodiment has been applied, as viewed from a vehicle front side.

Explanation follows regarding a sixth exemplary embodiment of a vehicle side section structure according to the present disclosure, with reference to FIG. 11 and FIG. 12. Note that configuration portions similar to that of the first exemplary embodiment described above are appended with the same reference numerals, and explanation thereof is omitted.

The vehicle side section structure according to the present exemplary embodiment features the impact beam 48 and the door outer molding 54 being coupled together by a strap 100 serving as a coupling portion.

To explain further, as illustrated in FIG. 11, the strap 100 is configured by a resin material having a string shape. One end portion 100A of the strap 100 is attached to a vehicle width direction inner side of a vehicle upper side peripheral edge portion of the cover portion 54A by a non-illustrated anchor portion, joining portion, or the like. Another end portion 100B of the strap 100 is attached to a vehicle width direction outer face of the extending wall portion 48D of the impact beam 48 by a non-illustrated anchor portion, joining portion, or the like.

A groove 102 is formed in a portion at a vehicle upper side of the cover portion 54A overlapping with the door outer panel 26. The groove 102 extends along the transverse direction of the cover portion 54A from a portion of the cover portion 54A in the vicinity of the one end portion 100A of the strap 100. The groove 102 is configured having a size able to house the strap 100. A portion of the strap 100 extending in the vehicle vertical direction from the one end portion 100A of the strap 100 is disposed inside the groove 102.

A rectangular shaped slit portion 104 open toward the vehicle lower side is formed in a vehicle upper side peripheral edge portion of the opening 52 in the door outer panel 26, at a position that overlaps the groove 102 in the door outer molding 54 as viewed along the vehicle width direction. The size of the slit portion 104 is configured to a size such that the strap 100 can be inserted therein. The strap 100 starts at the one end portion 100A side of the strap 100, extends toward the vehicle width direction inner side, and passes through the groove 102 and the slit portion 104 in sequence. Note that the portion of the strap 100 disposed between the door outer panel 26 and the impact beam 48 is in a slack state.

Namely, in the present exemplary embodiment, as illustrated in FIG. 12, configuration is such that even if the door outer molding 54 separates from the door outer panel 26, the fastening state between the door outer molding 54 and the impact beam 48 is maintained by the strap 100. In a state in which the door outer molding 54 is attached to the door outer panel 26, the strap 100 is in a slack state. Accordingly, in a separated state, the door outer molding 54 is able to be displaced relative to the airbag 38 during inflation and deployment, and the door outer molding 54 does not obstruct inflation and deployment of the airbag 38.

Such configuration is able to exhibit basically the same operation and advantageous effects as the first exemplary embodiment described above. In addition, in the present exemplary embodiment, the door outer molding 54 is coupled to the impact beam 48 through the strap 100, and the coupled state between the door outer molding 54 and the impact beam 48 is maintained even in a state in which the door outer molding 54 has separated from the door outer panel 26. The present exemplary embodiment thereby enables loss of the door outer molding 54 during inflation and deployment of the airbag 38 to be suppressed.

Seventh Exemplary Embodiment

Figure 13:
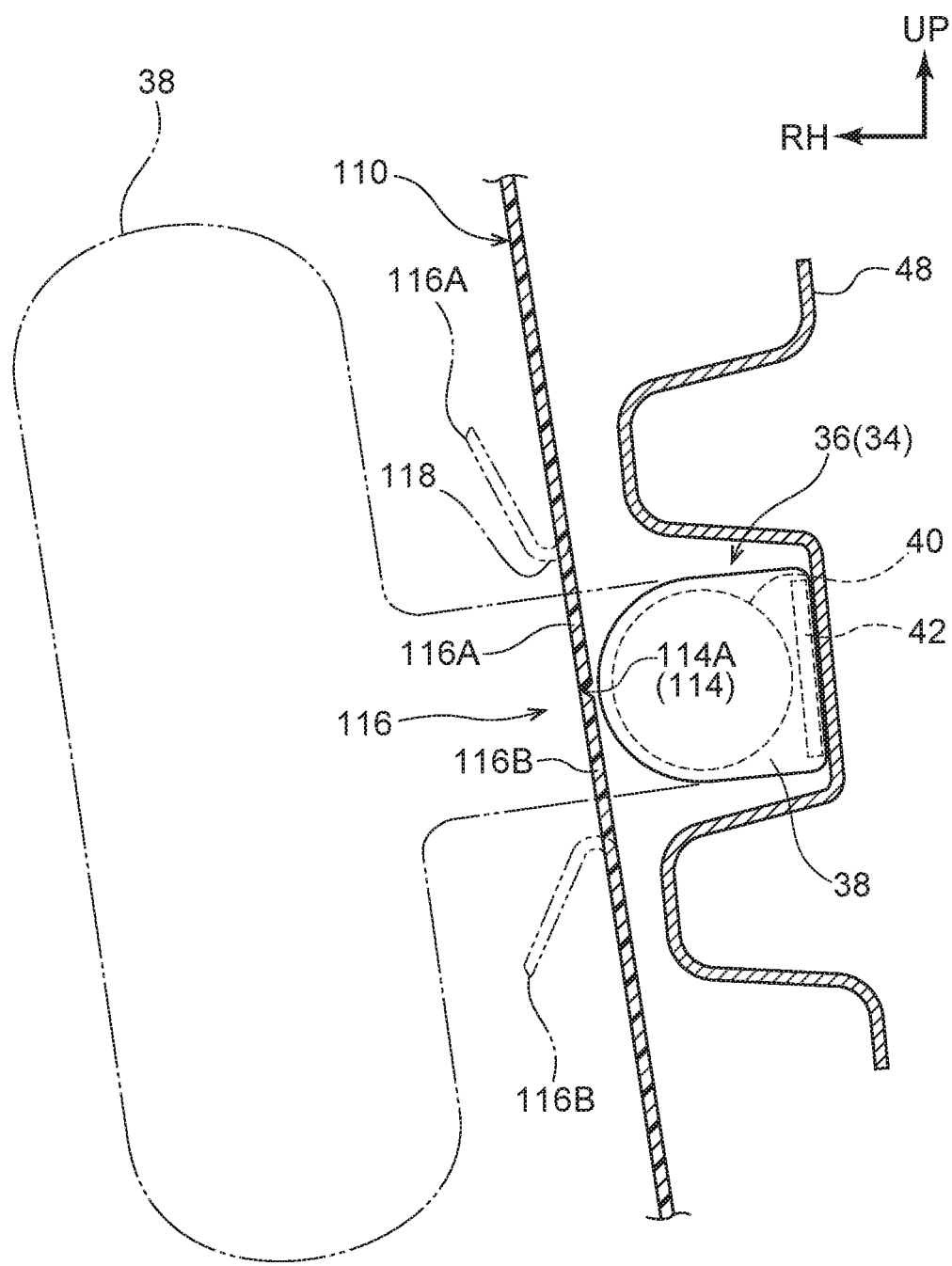
FIG. 13 is an enlarged cross-section (a cross-section corresponding to FIG. 1) illustrating configuration of relevant portions of a side door of a vehicle to which a vehicle side section structure according to a seventh exemplary embodiment has been applied, as viewed from a vehicle front side.
Figure 14:
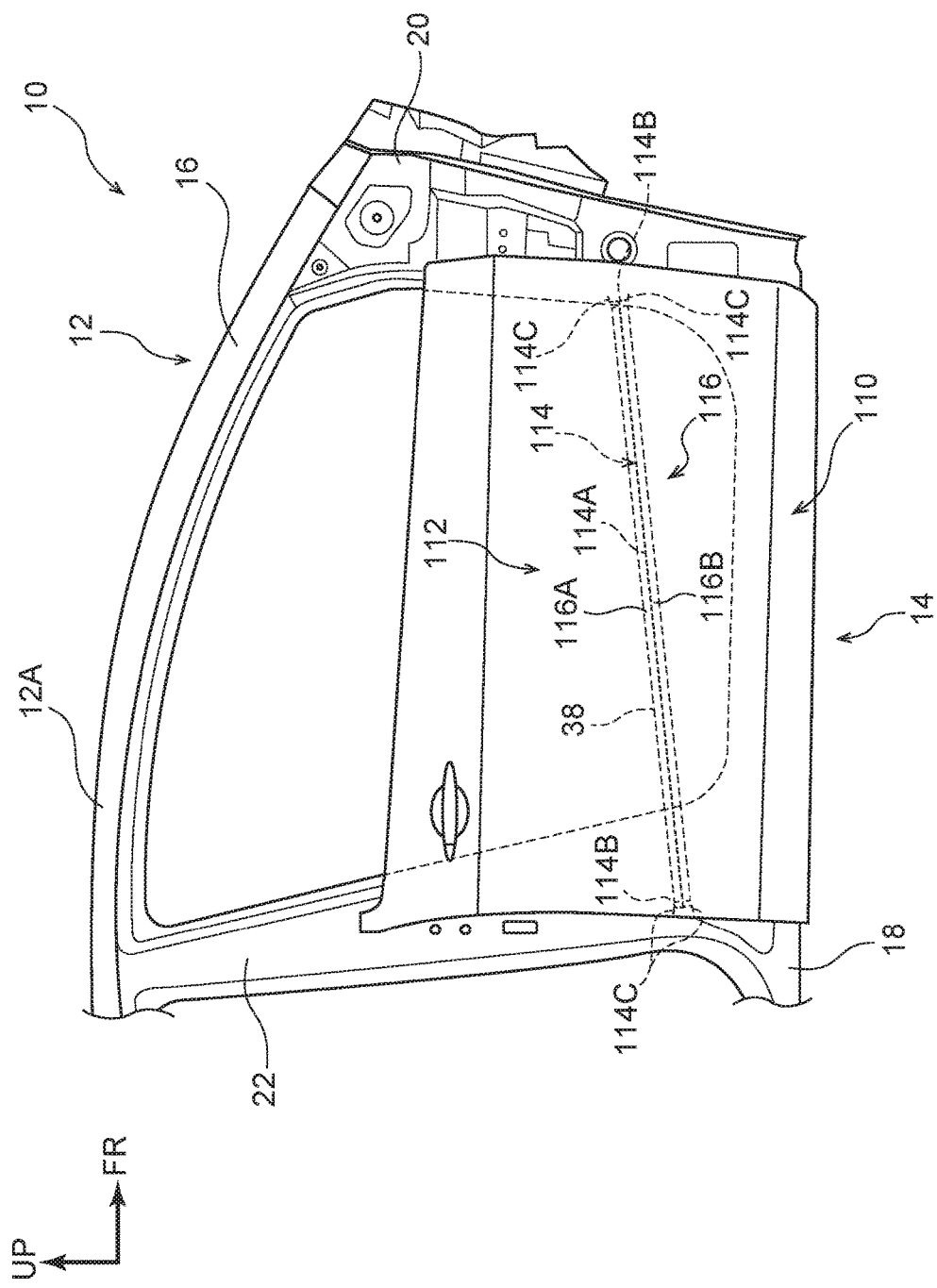
FIG. 14 is a side view illustrating configuration of a side door of a vehicle to which a vehicle side section structure according to the seventh exemplary embodiment has been applied, as viewed from a vehicle width direction outer side.

Explanation follows regarding a seventh exemplary embodiment of a vehicle side section structure according to the present disclosure, with reference to FIG. 13 and FIG. 14. Note that configuration portions similar to that of the first exemplary embodiment described above are appended with the same reference numerals, and explanation thereof is omitted.

The vehicle side section structure according to the present exemplary embodiment features a door outer panel 110 made of resin of a predetermined strength, and by an airbag inflation portion 112 configured including a tear portion 114 provided to the door outer panel 110.

To explain further, as illustrated in FIG. 14, the shape of the door outer panel 110 has basically the same shape as the door outer panel 26. However, in contrast to the door outer panel 26, the door outer panel 110 is attached to the door inner panel 28 by a non-illustrated anchor portion or joining portion.

As illustrated in FIG. 13, the tear portion 114 is provided to a vehicle width direction inner face of the door outer panel 110. The tear portion 114 has, for example, a substantial H-shape as viewed along the vehicle width direction, and is configured so as to split (tear) when acted upon by inflation pressure from the airbag 38 of a predetermined value or greater. More specifically, the tear portion 114 is configured including a first tear portion 114A, second tear portions 114B, and third tear portions 114C. The first tear portion 114A is configured by a groove shape that extends along the airbag 38, as viewed along the vehicle width direction. The second tear portions 114B are respectively provided at each end portion of the first tear portion 114A, and are configured by groove shapes that extend along a direction orthogonal to the first tear portion 114A. The third tear portions 114C are configured by groove shapes that extend at an angle with respect to the second tear portions 114B from each end portion of the second tear portions 114B, toward an opposite side of the second tear portions 114B to that of first tear portion 114A.

The tear portion 114 described above is provided to the door outer panel 110 so as to form a vertical pair of airbag doors 116 made up of an upper door 116A and a lower door 116B. The airbag doors 116 are configured such that when the tear portion 114 splits due to inflation pressure from the airbag 38, the upper door 116A deploys toward the vehicle upper side and the lower door 116B deploys toward the vehicle lower side. When the airbag doors 116 deploy, an opening 118 through which the airbag 38 is able to pass is formed in the door outer panel 110.

With such configuration, the door outer panel 110 is provided with a tear portion 114 including the first tear portion 114A and the second tear portions 114B. The tear portion 114 splits when the door outer panel 110 is pressed by the airbag 38 during inflation and deployment. The tear portion 114 splits such that the airbag doors 116 deploy in the vehicle vertical direction (the extension direction of the second tear portions 114B), forming the opening 118 through which the airbag 38 is able to pass in the door outer panel 110, and the airbag 38 inflates and deploys to the vehicle width direction outer side of the side door 14. The present exemplary embodiment thereby enables the formation of protrusions not necessitated by design on a styling face of the side door 14 to be suppressed, and enables a detrimental effect to the external appearance of the styling face to be suppressed, compared to a configuration in which an opening through which the airbag 38 is able to pass is provided in the door outer panel 110 and a covering member is disposed so as to cover the opening. The present exemplary embodiment thereby enables both the number of components in the side door 14 to be reduced and the external appearance of the side door 14 to be secured.

Moreover, in the present exemplary embodiment, the door outer panel 110 is made of resin, enabling a reduction in weight of the door outer panel 110 to be achieved. Moreover, compared to a case in which the door outer panel 110 is made of metal, load from the door outer panel 110 that is borne by the airbag 38 during inflation and deployment is reduced. As a result, the present exemplary embodiment enables the certainty with which the airbag 38 will inflate and deploy toward the vehicle width direction outer side to be improved while reducing the weight of the side door 14.

Supplementary Explanation of the Above Exemplary Embodiments (1) In the exemplary embodiments described above, although the vehicle side section structures according to the exemplary embodiments described above are applied to side sections on both vehicle width direction sides of the vehicle 10, the vehicle side section structure may be applied to a side section on just one vehicle width direction side of the vehicle 10.

(2) Moreover, in the exemplary embodiments described above, although configuration is such that the airbag device 36 and the impact beam are attached to a front side door, depending on the configuration of the vehicle 10, configuration may be made such that the airbag device 36 and the impact beam are provided to a rear side door.

(3) Furthermore, in the exemplary embodiments described above, although the impact beam is configured such that the vehicle width direction outer side of the airbag device 36 is open, there is no limitation thereto. Namely, depending on manufacturing processes or the like, the impact beam may be configured such that the vehicle width direction outer side of the airbag device 36 is covered within a range that does not obstruct inflation and deployment of the airbag 38.

(4) In addition, in the exemplary embodiments described above, although the airbag device 36 including the airbag 38 made of cloth is disposed in the side door 14, there is no limitation thereto. For example, configuration may be made such that a metal airbag supported by the impact beam is disposed inside the side door 14, and a tear portion, serving as an airbag inflation portion that splits as a result of being pressed by the metal airbag, is provided to the door outer panel 26. With such configuration, similarly to the seventh exemplary embodiment described above, attachment of the door outer molding to the door outer panel 26 is not required.

(5) In the first exemplary embodiment described above, the door outer molding 54 is attached to the opening 52 in the door outer panel 26. However, the door outer molding 62 may be attached to the opening 52.

(6) In the second exemplary embodiment described above, although the extending wall portion 70B is provided to the impact beam 70, depending on the configuration of the side door 14 or the like, configuration may be made such that an extending wall portion 70B is not provided to the impact beam 70.

(7) In the exemplary embodiments described above, the inflator 40 is configured in a circular tube shape, of which both longitudinal direction end portions are closed. However, in the embodiments other than the third exemplary embodiment from out of the first exemplary embodiment to the fifth exemplary embodiment, the inflator 40 may be configured having a different shape. For example, in the embodiments other than the third exemplary embodiment from out of the first exemplary embodiment to the fifth exemplary embodiment, the inflator 40 may be configured in an angular tube shape, of which both longitudinal direction end portions are closed. Such configuration enables the inflator 40 to be easily positioned with respect to the impact beam.

(8) In the sixth exemplary embodiment described above, although the door outer molding 54 and the impact beam 48 are coupled together by the strap 100, there is no limitation thereto. For example, configuration may be made such that any impact beam out of the impact beams 60, 70, 80, and 90 is disposed in place of the impact beam 48, and this impact beam and the door outer molding 54 are coupled together through the strap 100. Moreover, the configuration of the strap 100 is not limited to that described above. For example, depending on the configuration or the like of the impact beam, the strap 100 may be configured into a belt shape by synthetic fibers such as nylon fibers. Further, the locations where the impact beam and the door outer molding 54 are coupled together by the strap 100 is not limited to that described above. For example, depending on the configuration or the like of the side door 14, configuration may be made such that a vehicle lower side portion of the impact beam and a vehicle lower side portion of the door outer molding 54 are coupled together through the strap 100. Note that the shapes and the placement locations of the groove 102 and the slit portion 104 may be changed as appropriate in accordance with the locations where the impact beam and the door outer molding 54 are coupled together by the strap 100.

(9) In the seventh exemplary embodiment described above, although the tear portion 114 is basically disposed running along the peripheral edge portions of the airbag doors 116, there is no limitation thereto, and tear portions may be disposed at the centers of rotation of the airbag doors 116. Such configuration enables the airbag doors 116 to be deployed more smoothly. Moreover, the door outer panel 110 may be configured using two-color molding, in which a portion for the airbag doors 116 is formed from a flexible resin and other portions are formed from a rigid resin.

What is claimed is:

1. A vehicle side section structure comprising:
a door outer panel that configures a vehicle width direction outer side portion of a side door;
a door inner panel that configures a vehicle width direction inner side portion of the side door;
an airbag that is capable of being inflated and deployed toward a vehicle width direction outer side of the side door by gas ejected due to actuation of an inflator disposed between the door outer panel and the door inner panel;
a controller including a prediction section that predicts whether or not an object approaching the vehicle will collide with the side door, the controller actuating the inflator when it has been determined that the object will collide with the side door based on a signal output from the prediction section;
an airbag inflation portion that is normally closed off, the airbag inflation portion being provided to the door outer panel such that the airbag is capable of being inflated and deployed to the vehicle width direction outer side of the door outer panel when the airbag is inflated and deployed;
a reinforcement member that is disposed at the vehicle width direction inner side of the inflator, that includes a support portion supporting the inflator, and that is attached to the door inner panel; and
an airbag inflation portion that includes (a) an opening formed in the door outer panel for inflation of the airbag and (b) a door outer molding serving as a covering member, the door outer molding attached to the opening,
wherein the door outer molding includes a cover portion and a pair of anchor portions disposed along a longitudinal direction of the cover portion such that the anchor portions face each other along a transverse direction of the cover portion,
wherein each of the anchor portions has a pair of inclined face portions,
wherein one of the inclined face portions is formed on a first side of the anchor portion that is a cover portion side, the one of the inclined face portions being inclined in a direction such that a width of the anchor portion in the transverse direction of the cover portion increases on progression toward a second side of the anchor portion, the second side of the anchor portion being a side that is opposite the cover portion, and
wherein an other of the inclined face portions is formed on the second side of the anchor portion, the other of the inclined face portions inclined in a direction such that the width of the anchor portion in the transverse direction increases on progression toward the first side of the anchor portion.

2. The vehicle side section structure of claim 1, wherein:
the support portion is configured including
a side-wall portion that has its plate thickness direction in the vehicle width direction, and that extends along the vehicle front-rear direction,
an upper wall portion that extends out toward the vehicle width direction outer side from a vehicle upper side peripheral edge portion of the side-wall portion, and
a lower wall portion that extends out toward the vehicle width direction outer side from a vehicle lower side peripheral edge portion of the side-wall portion; and
the inflator is configured in a tube shape having a closed end portion, and the inflator is disposed in a state surrounded by the support portion except for at the vehicle width direction outer side.

3. The vehicle side section structure of claim 1, wherein:
the support portion is configured in a plate shape that extends along the vehicle front-rear direction, and the support portion has a circular arc shaped cross-section profile open toward the vehicle width direction outer side as viewed along its longitudinal direction; and
the inflator is configured in a circular tube shape having a closed end portion, and the inflator is disposed in a state surrounded by the support portion except for at the vehicle width direction outer side.

4. The vehicle side section structure of claim 2, wherein:
the reinforcement member is configured including at least one of
an upper extending wall portion that is disposed at the vehicle width direction outer side of the support portion and that extends out toward a vehicle upper side from a vehicle upper side peripheral edge portion of the support portion, or
a lower extending wall portion that is disposed at the vehicle width direction outer side of the support portion and that extends out toward a vehicle lower side from a vehicle lower side peripheral edge portion of the support portion.

5. The vehicle side section structure of claim 3, wherein:
the reinforcement member is configured including at least one of
an upper extending wall portion that is disposed at the vehicle width direction outer side of the support portion and that extends out toward a vehicle upper side from a vehicle upper side peripheral edge portion of the support portion, or
a lower extending wall portion that is disposed at the vehicle width direction outer side of the support portion and that extends out toward a vehicle lower side from a vehicle lower side peripheral edge portion of the support portion.

6. The vehicle side section structure of claim 1, wherein:
the inflator is configured in a tube shape extending along the vehicle front-rear direction and having a closed end portion; and
the support portion is configured including
an inner side-wall portion that is disposed at the vehicle width direction inner side of the inflator, that extends along the inflator, and that is joined to the door inner panel in a state in which its plate thickness direction is in the vehicle width direction,
a first extending wall portion that extends out toward the vehicle width direction outer side from a peripheral edge portion at either a vehicle upper side or a vehicle lower side of the inner side-wall portion,
an outer side-wall portion that extends out toward an opposite side of the first extending wall portion to that of the inflator from a vehicle width direction outer side peripheral edge portion of the first extending wall portion, and
a second extending wall portion that extends out toward the vehicle width direction inner side from a peripheral edge portion of the outer side-wall portion on the opposite side of the outer side-wall portion to that of the inflator.

7. The vehicle side section structure of claim 4, wherein:
the reinforcement member is provided with the upper extending wall portion and the lower extending wall portion; and the reinforcement member includes a pair of tube shaped beam members extending along the support portion, the beam members being respectively disposed at the vehicle width direction inner side of the upper extending wall portion and the lower extending wall portion.

8. The vehicle side section structure of claim 4, wherein:
the reinforcement member is provided with the upper extending wall portion and the lower extending wall portion, a vehicle upper side of the upper extending wall portion being provided with a first reinforcement portion that is continuous with the upper extending wall portion, and a vehicle lower side of the lower extending wall portion being provided with a second reinforcement portion that is continuous with the lower extending wall portion;
the first reinforcement portion is configured including
   a first upper reinforcement wall portion that extends out toward the vehicle width direction inner side from a vehicle upper side peripheral edge portion of the upper extending wall portion, and
   a second upper reinforcement wall portion that extends out toward the vehicle upper side from a vehicle width direction inner side peripheral edge portion of the first upper reinforcement wall portion; and
the second reinforcement portion is configured including
   a first lower reinforcement wall portion that extends out toward the vehicle width direction inner side from a vehicle lower side peripheral edge portion of the lower extending wall portion, and
   a second lower reinforcement wall portion that extends out toward the vehicle lower side from a vehicle width direction inner side peripheral edge portion of the first lower reinforcement wall portion.

9. The vehicle side section structure of claim 1, wherein:
the covering member is coupled to the reinforcement member through a coupling portion; and
the coupling portion is able to maintain the coupled state between the covering member and the reinforcement member in a state in which the covering member has separated from the door outer panel.

10. The vehicle side section structure of claim 1, wherein:
the airbag inflation portion is configured including a covering member that covers an opening formed in the door outer panel through which the airbag is able to pass during inflation and deployment, the covering member being configured so as to split when pressed by the airbag so as to open into a state through which the airbag is able to pass.

11. The vehicle side section structure of claim 1, wherein:
the airbag inflation portion is configured including a tear portion that is provided to the door outer panel, the tear portion being configured so as to split when the door outer panel is pressed by the airbag during inflation and deployment and such that by splitting, an opening through which the airbag is able to pass is formed in the door outer panel.

12. The vehicle side section structure of claim 11, wherein the door outer panel is made of resin.

13. The vehicle side section structure of claim 1, wherein the inflator is disposed at a portion of the side door further toward the vehicle front than a vehicle front-rear direction central portion of the side door.

14. The vehicle side section structure of claim 1, wherein:
the reinforcement member is disposed such that, as viewed along the vehicle width direction, a portion of the reinforcement member overlaps at least one of
   a front pillar that configures part of a vehicle body, a portion of the front pillar being disposed so as to overlap a vehicle front side peripheral edge portion of the door inner panel as viewed along the vehicle width direction, or
   a center pillar that configures part of the vehicle body, a portion of the center pillar being disposed so as to overlap a vehicle rear side peripheral edge portion of the door inner panel as viewed along the vehicle width direction.

\* \* \* \* \*